United States Patent
Barale et al.

(10) Patent No.: US 11,415,188 B2
(45) Date of Patent: Aug. 16, 2022

(54) FIXED CALIPER BODY FOR A DISC BRAKE DISC

(71) Applicant: FRENI BREMBO S.p.A., Curno (IT)

(72) Inventors: Pietro Barale, Curno (IT); Andrea Milanesi, Curno (IT)

(73) Assignee: Freni Brembo S.p.A., Bergamo (IT)

(*) Notice: Subject to any disclaimer, the term of this patent is extended or adjusted under 35 U.S.C. 154(b) by 52 days.

(21) Appl. No.: 16/971,725

(22) PCT Filed: Feb. 21, 2019

(86) PCT No.: PCT/IB2019/051419
§ 371 (c)(1),
(2) Date: Aug. 21, 2020

(87) PCT Pub. No.: WO2019/162871
PCT Pub. Date: Aug. 29, 2019

(65) Prior Publication Data
US 2020/0393007 A1    Dec. 17, 2020

(30) Foreign Application Priority Data
Feb. 23, 2018   (IT) .................. 102018000002973

(51) Int. Cl.
*F16D 55/00* (2006.01)
*F16D 55/228* (2006.01)
(Continued)

(52) U.S. Cl.
CPC ....... *F16D 55/228* (2013.01); *F16D 65/0075* (2013.01); *F16D 65/18* (2013.01);
(Continued)

(58) Field of Classification Search
CPC .... F16D 55/228; F16D 65/0075; F16D 65/18; F16D 65/183; F16D 2055/002
See application file for complete search history.

(56) References Cited

U.S. PATENT DOCUMENTS

| 3,261,429 A | 7/1966 | Burnett et al. |
| 5,515,948 A * | 5/1996 | Gilliland ............... F16D 55/228 188/264 F |

(Continued)

FOREIGN PATENT DOCUMENTS

| EP | 1167804 A1 | 1/2002 |
| EP | 1303708 B1 | 3/2004 |

(Continued)

OTHER PUBLICATIONS

European Patent Office, International Search Report with Written Opinion, issued in PCT/IB2019/051419, dated Apr. 8, 2019, 17 pages, European Patent Office, Rijswijk, Netherlands.

*Primary Examiner* — Nicholas J Lane
(74) *Attorney, Agent, or Firm* — Marshall & Melhorn, LLC

(57) ABSTRACT

A fixed brake caliper for a disc brake disc has a first half-body housing a first thrust device, and facing a first braking surface, a second half-body housing a second thrust device, and facing a second braking surface, and a first bridge element connecting and supporting the second half-body to the first half-body. The first bridge element has a first and a second guiding and resting bridge surfaces. The first half-body has a first protrusion protruding towards the opposite second half-body. The second half-body has a second protrusion protruding towards the opposite first half-body. The first and second half-bodies and the bridge element are mutually separable. The first and second protrusions each delimit a guiding and resting half-body surface, respectively. The first bridge element rests the first bridge surface against the first half-body surface and the second bridge surface against the second half-body surface.

18 Claims, 20 Drawing Sheets

(51) Int. Cl.
  *F16D 65/00*    (2006.01)
  *F16D 65/18*    (2006.01)
(52) U.S. Cl.
  CPC .. *F16D 2055/002* (2013.01); *F16D 2200/003* (2013.01); *F16D 2200/006* (2013.01); *F16D 2200/0047* (2013.01)

(56) References Cited

U.S. PATENT DOCUMENTS

| | | | |
|---|---|---|---|
| 5,538,105 | A | 7/1996 | Rike |
| 5,819,886 | A | 10/1998 | Null |
| 6,260,670 | B1 | 7/2001 | Machara |
| 6,910,555 | B2 | 6/2005 | Ciotti et al. |
| 7,137,488 | B2 | 11/2006 | Gilliland |
| 9,371,874 | B2 | 6/2016 | Previtali et al. |
| 10,502,275 | B2 * | 12/2019 | Piccoli .................... B22F 7/06 |
| 10,520,053 | B2 | 12/2019 | Crippa et al. |
| 2006/0231354 | A1 * | 10/2006 | Gilliland ............... F16D 55/228 188/73.47 |
| 2007/0089943 | A1 | 4/2007 | Gilliland |
| 2009/0236187 | A1 * | 9/2009 | Bach ..................... F16D 65/095 188/72.5 |
| 2010/0096223 | A1 * | 4/2010 | Itsuaki .................. F16D 55/228 188/72.5 |
| 2010/0170755 | A1 * | 7/2010 | Biggs .................... F16D 55/228 188/72.4 |
| 2013/0264155 | A1 * | 10/2013 | Huang .................. F16D 55/228 188/73.47 |
| 2014/0158488 | A1 * | 6/2014 | Valle ...................... B60T 1/065 188/370 |
| 2018/0149219 | A1 * | 5/2018 | Noh ...................... B22D 25/02 |
| 2018/0231083 | A1 * | 8/2018 | Crippa .................. F16D 65/847 |

FOREIGN PATENT DOCUMENTS

| | | |
|---|---|---|
| GB | 936222 A | 9/1963 |
| GB | 1160713 A | 8/1969 |
| GB | 2214581 A | 9/1989 |
| WO | 2010/077374 A1 | 7/2010 |
| WO | 2012/059894 A2 | 5/2012 |
| WO | 2014/091423 A2 | 6/2014 |
| WO | 2017/021874 A1 | 2/2017 |

* cited by examiner

FIXED CALIPER BODY FOR A DISC BRAKE DISC

CROSS-REFERENCE TO RELATED APPLICATIONS

This application is a National Phase Application of PCT International Application No. PCT/IB2019/051419, having an International Filing Date of Feb. 21, 2019 which claims priority to Italian Application No. 102018000002973 filed Feb. 23, 2018, each of which is hereby incorporated by reference in its entirety.

FIELD OF THE INVENTION

The present invention relates to a disc brake caliper body, preferably of fixed caliper type, which can be used on vehicles and in particular, but not necessarily, intended for high-performance motor cars.

The present invention further relates to a disc brake caliper and to a disc brake assembly having a caliper body of the type specified above.

BACKGROUND OF THE INVENTION

In a disc brake, the brake caliper is generally arranged straddling the outer peripheral margin of a brake disc, adapted to rotate about a rotation axis (A-A) defining an axial direction (X-X). In a disc brake, a radial direction (R-R), arranged substantially orthogonal to said axial direction (X-X), and a punctually tangential or altogether circumferential direction (C-C), orthogonal to both said axial direction (X-X) and said radial direction (R-R), is further defined.

It is known that a caliper body of fixed caliper disc brake can be associated with a disc so as to maintain its distance from the disc unchanged. Said known caliper body comprises a first half-body, adapted to accommodate first means for generating a braking action, arranged facing a first braking surface of an outer side of said disc, as well as a second half-body, adapted to accommodate second means for generating the braking action, arranged facing a second braking surface of an inner side of said disc. Said first and second half-bodies are connected, by means of fixing means, to two bridge elements arranged straddling the disc.

The expression "outer side" means the side of the disc brake assembly which faces towards the outside of the vehicle when it is fitted on the hub and stub axle, or hub-holder, of the wheel. Similarly, the expression "inner side" means the side of the assembly which faces towards the inside of the vehicle when it is fitted on the wheel hub.

As known, the discs for disc brakes comprise a bell, adapted to associate the disc with a vehicle hub, from which an annular portion, named braking band, intended to cooperate with pads of a caliper, extends.

Said braking band is intended to cooperate with calipers for disc brake adapted to apply a braking action on the vehicle, whereby applying, by means of pads, friction on opposite surfaces of the two plates, named braking surfaces.

It is known that during the operation of the brakes, the friction between the pads of the brake calipers and the braking surfaces of the braking band generates a high amount of heat which needs to be disposed of.

Indeed, the generated heat determines the onset of many undesired phenomena, such as, for example, the deformation of the braking band, the formation of cracks on the braking surfaces or localized state transformations of the material constituting the braking band which, in turn, lead to the deterioration of the braking band itself.

As mentioned above, during the braking of a vehicle, the significant and high forces which bias the caliper body are a clamping action and a braking action. These actions are produced by the means adapted to generate the braking action, e.g. at least one pair of cylinder and piston assemblies, accommodated in the half-bodies, the pistons of which act by means of the pads on the opposite braking surfaces of the disc.

The clamping action of the pads against the braking surfaces of the disc is directed axially and is balanced by the structure of the caliper body which is arranged straddling the disc. In particular, such action is contrasted by the bridge elements which, by embracing the disc, form closed force loops. This action biases the caliper body, determining a spreading of the bridge elements, or, in other words, a bending of the caliper body along the axes in tangential direction, or with concavity about radial axes.

The braking action is instead directed tangentially and in particular in the rotation direction of the disc. This action is transmitted by the disc to the pads and contrasted by shoulders provided in the bridge elements, so as to be released onto the supporting means of the caliper body which are rigidly coupled, for example, to a stub axle or hub-carrier of a wheel of the vehicle. This action biases the bridge elements whereby also deforming portions thereof necessary to connect the half-bodies. Furthermore, the braking action is released onto the supporting means only on the side of the caliper body facing the inner side of the disc, whereby also determining a bending of the caliper body about the radial axes.

The aforesaid actions are notoriously not uniformly distributed on the caliper body and are of a magnitude which is variable over time, whereby causing, in addition to deformations of the caliper body which are sometimes unacceptable for a correct operation of the disc brake, also vibrations and undesired screeching.

Therefore, the need is strongly felt to suggest a caliper body of fixed caliper disc brake, which has such structural and functional characteristics as to overcome the aforesaid disadvantages described with reference to the prior art and in particular to lighten the caliper body but at the same time strengthen the bridge elements arranged straddling the disc brake and at the same time simplify the construction of the caliper body and especially the working of the thrust device housings, e.g. of the cylinders adapted to accommodate the thrust pistons adapted to bias the brake pads.

In some prior art solutions, especially for medium-to-low-performance vehicles, it is known to use a disc brake of the floating caliper type, in which a caliper having a single piston or multiple pistons but all on the same side of the disc brake is supported in the condition that the brake caliper can be freely moved with respect to a supporting element, or bracket, which is fixed to a fixed part of a vehicle, e.g. to the hub-holder, to support the pair of brake pads and with a sliding constraint which allows the supporting element to float or move freely with respect to the disc. As mentioned, in the case of the aforesaid disc brake with floating caliper, the piston is arranged only on one side of the rotor, i.e. the piston is arranged only on the inner side, or vehicle side, of the disc.

In the case of high-performance vehicles, opposed piston disc brakes have become common, because they can produce an excellent braking force, by virtue of their greater efficiency. In the disc brake of the opposed piston type, pistons are provided on both sides of a disc brake. During braking operations, a pair of pads is pushed against both opposite braking surfaces of the disc brake rotor by both opposite pistons. In this opposite piston disc brake, the rotor of the brake disc is interposed between the cylinders adapted to accommodate the pistons and the open sides of the cylinders are opposite to one another.

Therefore, in these high-performance vehicles, the need is strongly felt for a caliper body of great stiffness able to maintain the orthogonality between the bridge elements and the half-bodies facing the braking surfaces of the brake disc.

Document GB2214581 by Freni Brembo S.p.A. shows a single-block brake caliper body solution with opposed pistons or fixed caliper body.

Indeed, this single-block caliper body has a structure in which the elongated portions facing the disc brake have a plurality of cylinders integrated in a single body. However, the structure described in the aforesaid patent publication is disadvantageous in that it requires time and complex special methods for working the cylinders and assembling the disc brake of the opposed piston type made in a single block. Therefore, it is impossible to avoid an increase in production costs.

In order to simplify the working of the cylinders, solutions are known in which the calipers are made in two halves and then joined.

In this case, the body having a plurality of cylinders is divided into half-bodies having an attachment portion, or attachment half-body, to be connected to a stationary portion of a vehicle, e.g. a hub-holder, and also having a cylinder on the inner front side, and a portion or outer body having a cylinder on the outer front side. After both bodies have been worked to form the cylinders required in them, the half-bodies are connected and fixed to one another by bolts.

Examples of these caliper bodies are known from GB936222 by DUNLOP RUBBER CO; U.S. Pat. No. 3,261,429 by Bendix Corp.; U.S. Pat. No. 5,538,105 by DAYTON WALTHER CORP and U.S. Pat. No. 5,819,886 by Robert Null.

However, in the known structure mentioned above of the caliper in two parts, the bolts for attaching and fixing the inner body and the outer body to one another receive a braking torque which is given by the outer brake pad and biased by the pistons of the outer body, braking action generated by the friction caused between the outer side face of the rotor, or disc brake, and the outer pad in the braking process. It is therefore necessary for the bolts to withstand this braking torque. Therefore, the diameters of the bolts must be large in size, to the extent of increasing size and weight of the caliper body. The weight of the disc brake, which is supported in an end portion of the angle portion of a vehicle, or corner, becomes an unsprung weight, i.e. not suspended by elastic and/or damping elements. Accordingly, even when the weight of the disc brake increases only slightly, the running performance of a vehicle is also strongly biased by the increase of unsprung weight.

Therefore, the need is strongly felt also to reduce the overall weight of the fixed brake caliper.

This need, combined with the contrasting one of stiffening the caliper body and further the contrasting need of simplifying the working of the thrust means housings, has led to some known solutions which however do not optimize these conflicting requirements.

For instance, there is the solution of U.S. Pat. No. 6,260,670 by AKEBONO BRAKE IND of two-part caliper, the solution of EP1303708B1 by Freni Brembo S.p.A. of three-part caliper, the solution of U.S. 2009236187 of CONTINENTAL TEVES AG & Co OHG of three-part caliper, the solution of U.S. 2006231354 by WARREN, the solution of U.S. 2010170755 by Robert Biggs and the solution of WO201491423 by Franco Iorio.

The solution of U.S. Pat. No. 5,515,948 by Gilliland also shows a caliper in multiple parts connected together by calibrated pins extending straddling the disc brake. This known solution, in order to allow to have the desired strength and mechanical rigidity, requires however calibrated pins and connections between the different parts of considerable diameter, whereby causing considerable radial dimensions of the caliper as a whole, resulting in a solution which is not very suited to the current requirements of a large-size brake disc rotor adapted to increase the range of action of the braking action which leaves very little space between itself and the inner surface of the rim of the vehicle wheel. Furthermore, this known solution which requires large-size steel pins is not optimal for the need of reducing the overall weight of the brake caliper.

Therefore, the need remains strongly felt to provide a fixed caliper body in separable parts but which ensures an accurate alignment of the bridges and of the elongated elements which ensures a perfect orthogonality between the components, which orthogonality does not create problems for pads, such as jamming and non-uniform wear thereof.

Therefore, the need remains strongly felt to improve the accuracy with which the connection elements, or bridges, are connected to the half-bodies, in order to stiffen the parallelogram created by the half-bodies and the bridges. The further need is felt to provide a supporting surface of the bridge connection elements either parallel or perpendicular to the releasing plane of the braking action.

The problem underlying the present invention is thus to provide a fixed caliper body and a caliper, which have structural and functional characteristics such as to satisfy the aforementioned requirements and at the same time solve the drawbacks mentioned with reference to the prior art.

SUMMARY OF THE INVENTION

An object of the present invention is to provide a fixed caliper body, a brake caliper and a braking device in which the aforesaid mutually conflicting requirements are achieved and optimized.

This and other objects and advantages are achieved by a caliper body and a brake caliper as described and claimed herein.

Advantageous embodiments are also described.

The analysis of this solution shows that the suggested solution allows obtaining a caliper body which is light but at the same time able to support high braking actions without being excessively deformed and without exceeding in its overall dimensions.

Furthermore, the suggested solution allows considerably simplifying the working operations of the half-bodies of the caliper.

Furthermore, the suggested solution allows obtaining a braking comfort much higher than the solutions of the prior art, and consequently a reduction of the vibrations and in particular an absence of the vibrations which cause screeching.

BRIEF DESCRIPTION OF THE DRAWINGS

Further features and advantages of the brake caliper and of the brake disc will be apparent from the following description of its preferred embodiments, by way of non-limiting examples, with reference to the accompanying figures, in which.

DETAILED DESCRIPTION

Figure 1:
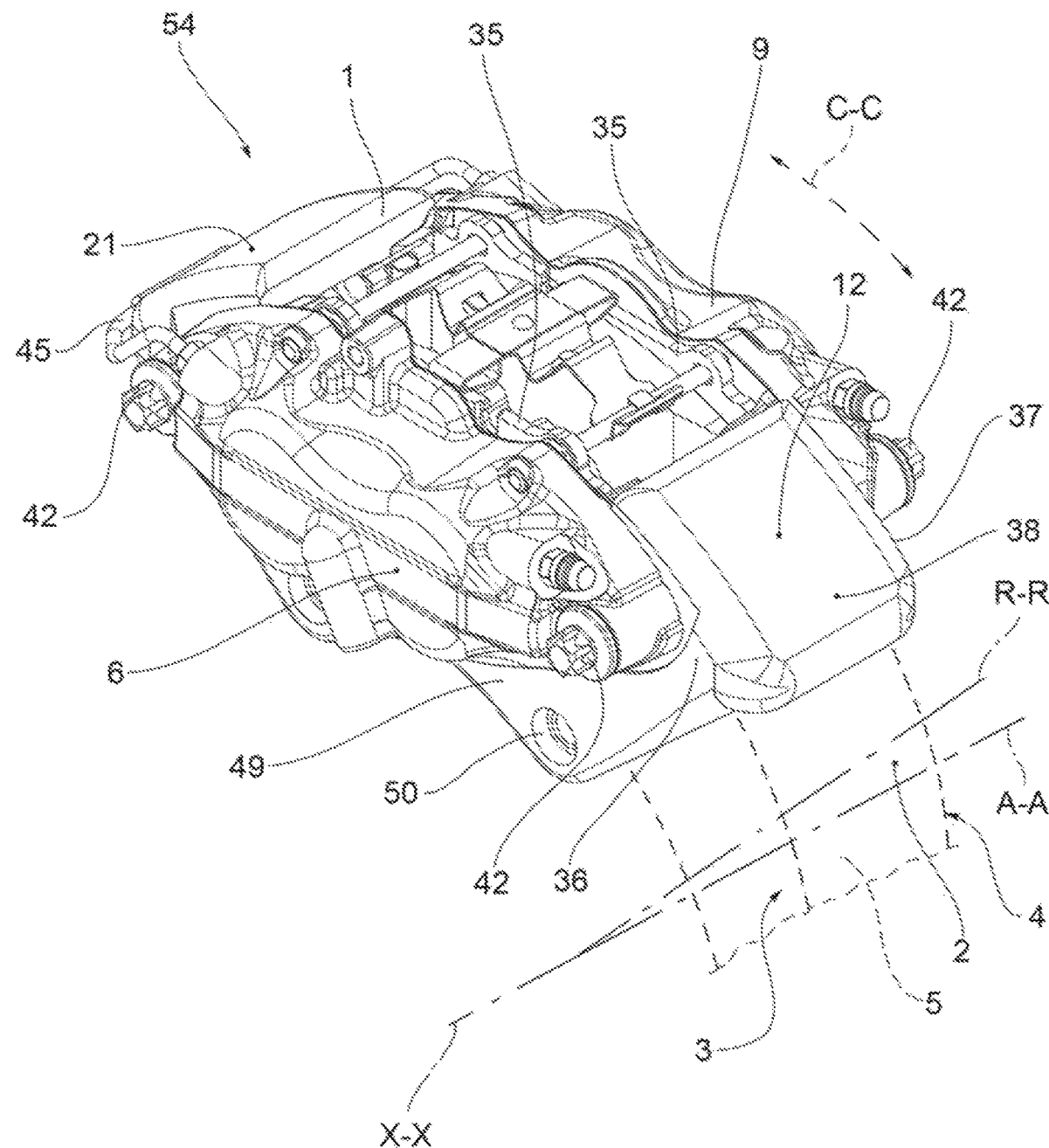
FIG. 1 is a vehicle side axonometric view of a fixed brake caliper according to the invention.
Figure 2:
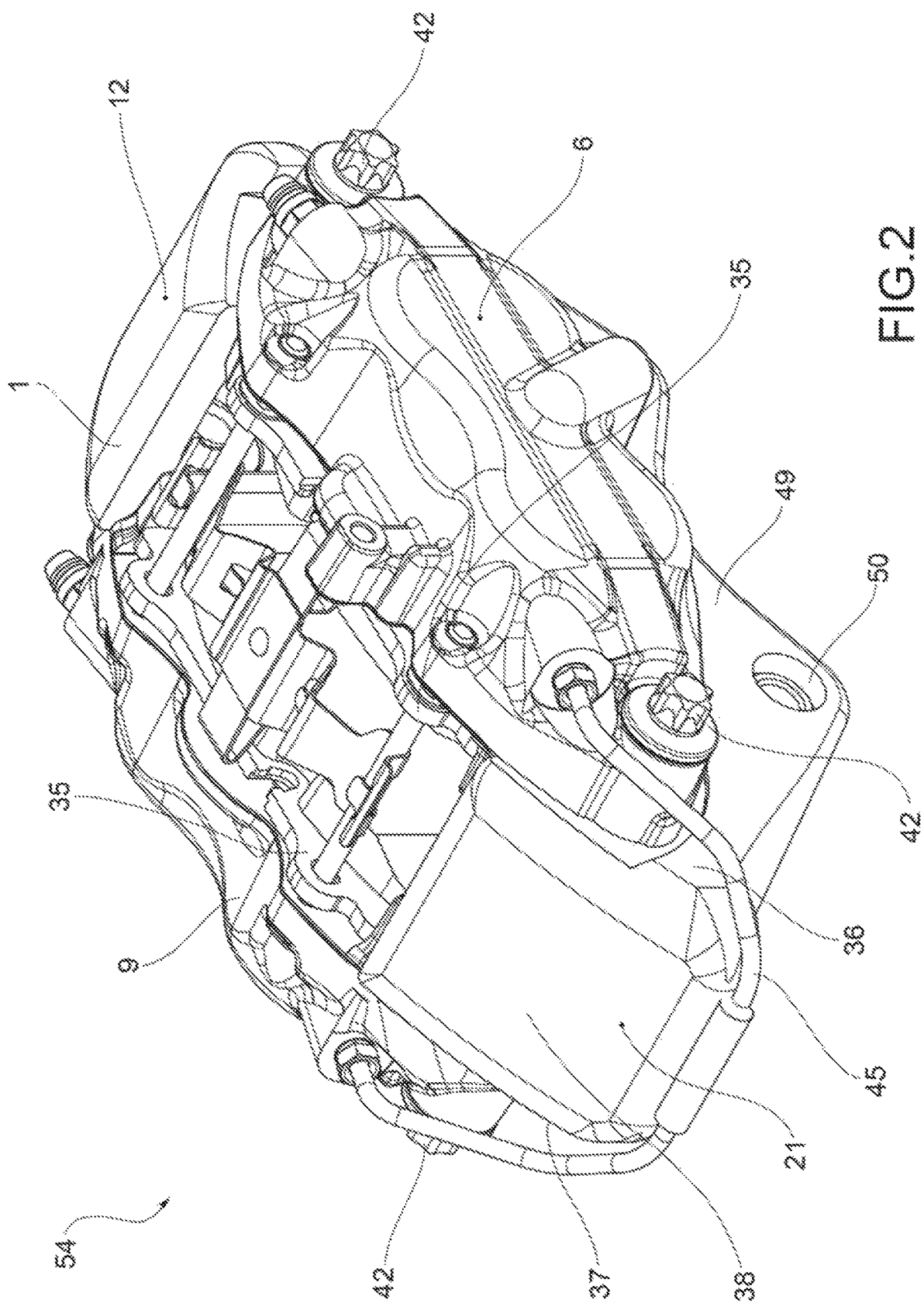
FIG. 2 shows an axonometric view from a different point of view, again on vehicle side, of the caliper in FIG. 1.
Figure 3:
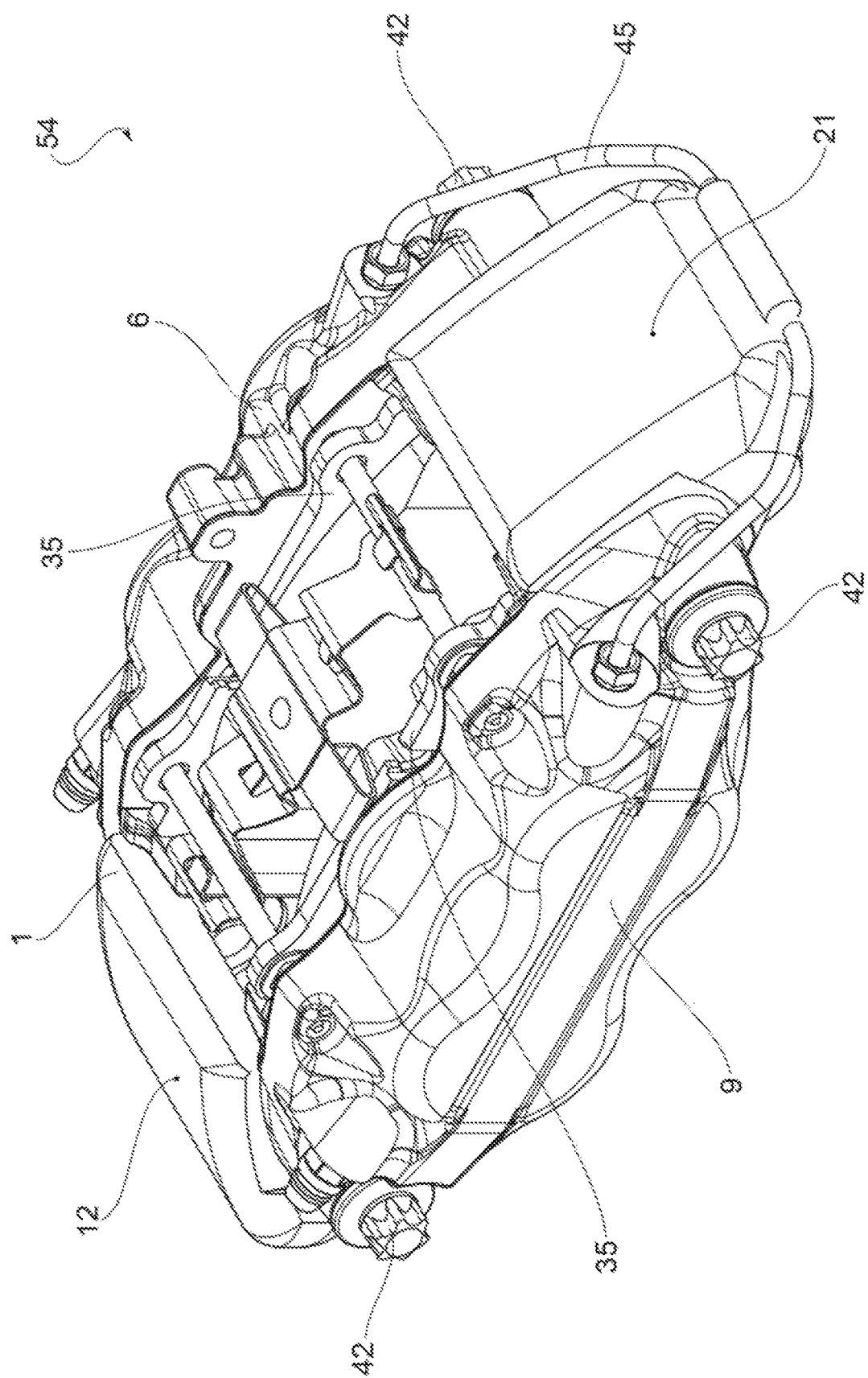
FIG. 3 is a wheel side axonometric view of the caliper in FIG. 1.
Figure 4:
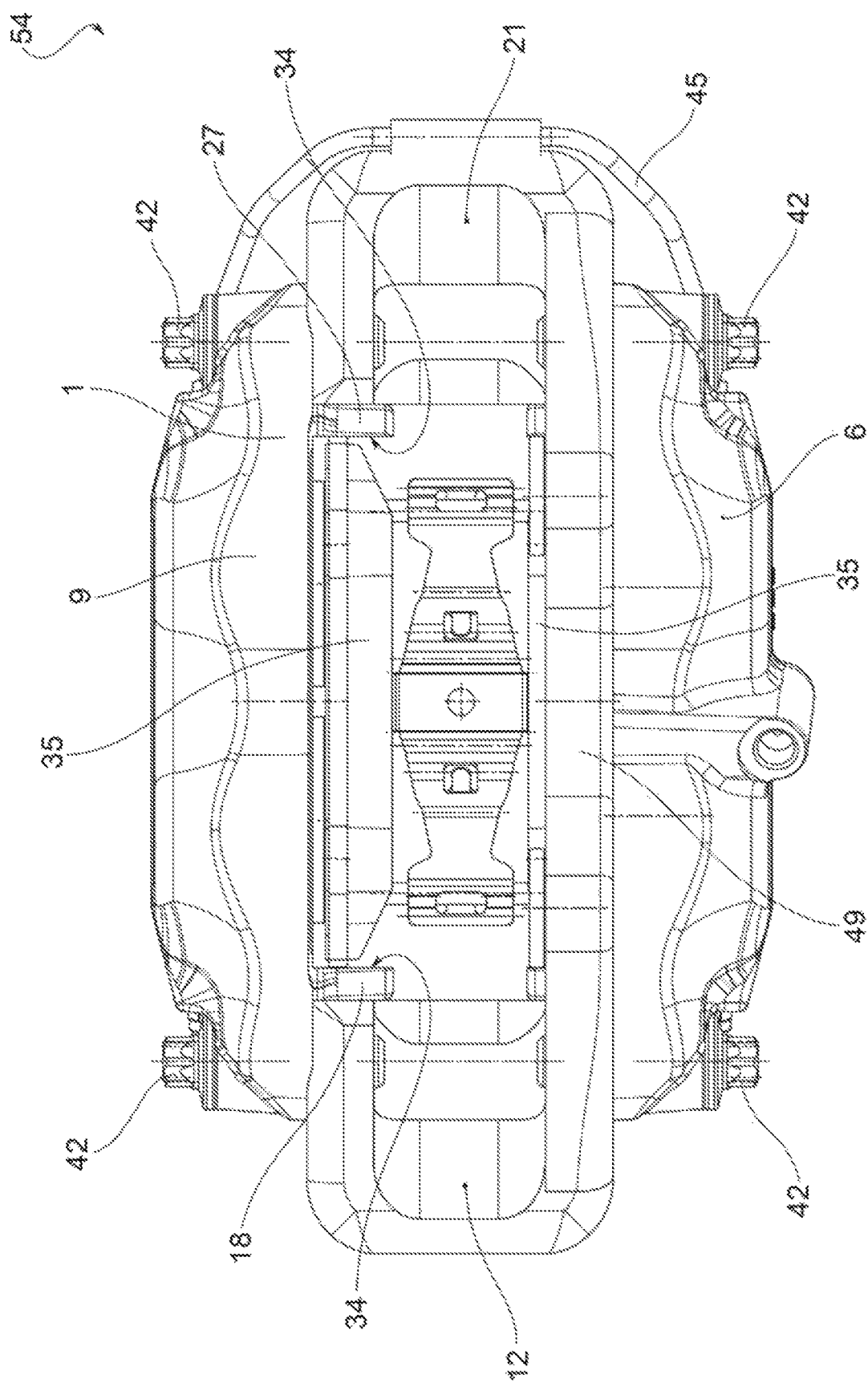
FIG. 4 shows a radial view of the caliper in FIG. 1 from the rotation axis of the disc outwards.
Figure 5:
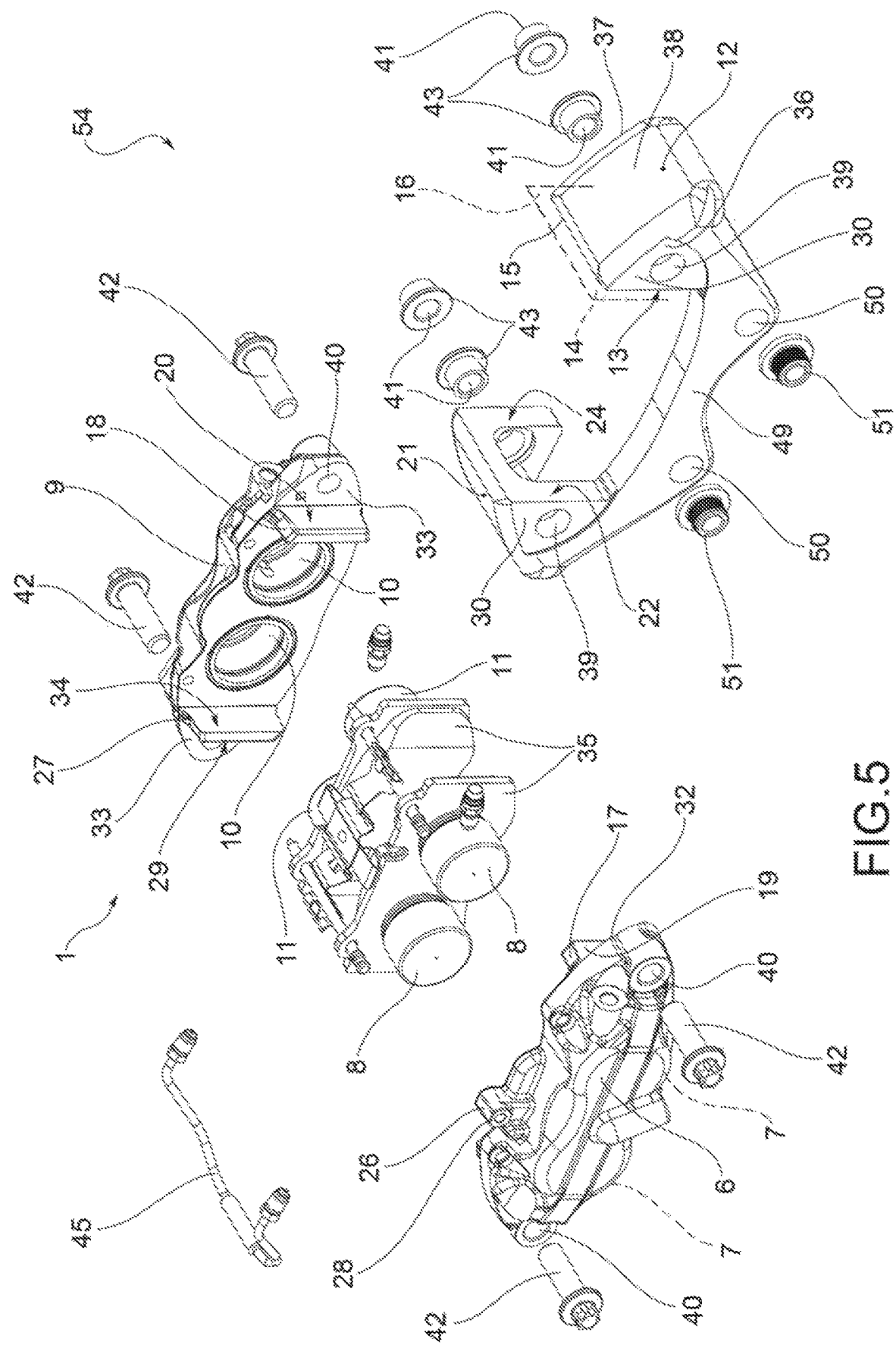
FIG. 5 is an axonometric view of the caliper in FIG. 1 with parts separated.
Figure 6:
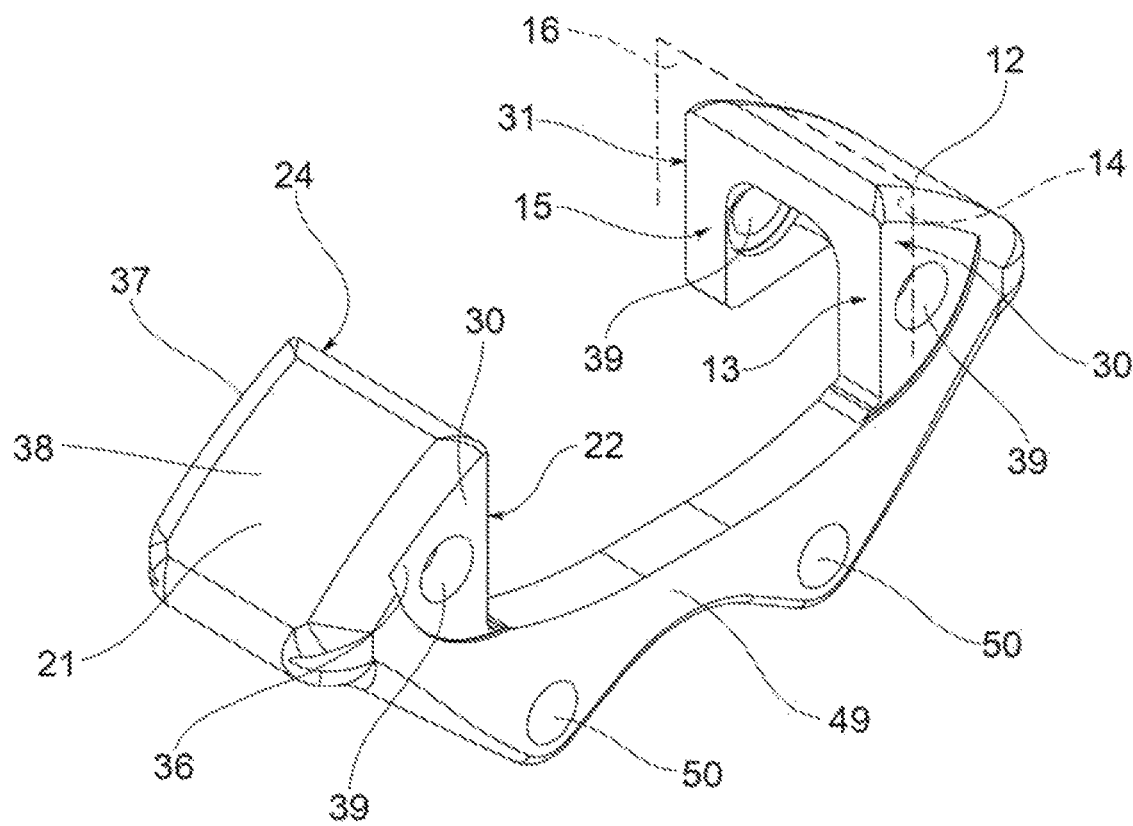
FIG. 6 shows a vehicle side axonometric view of a component of the caliper in FIG. 1, and in particular a first and second bridge element joined by a bridge crossbar.
Figure 7:
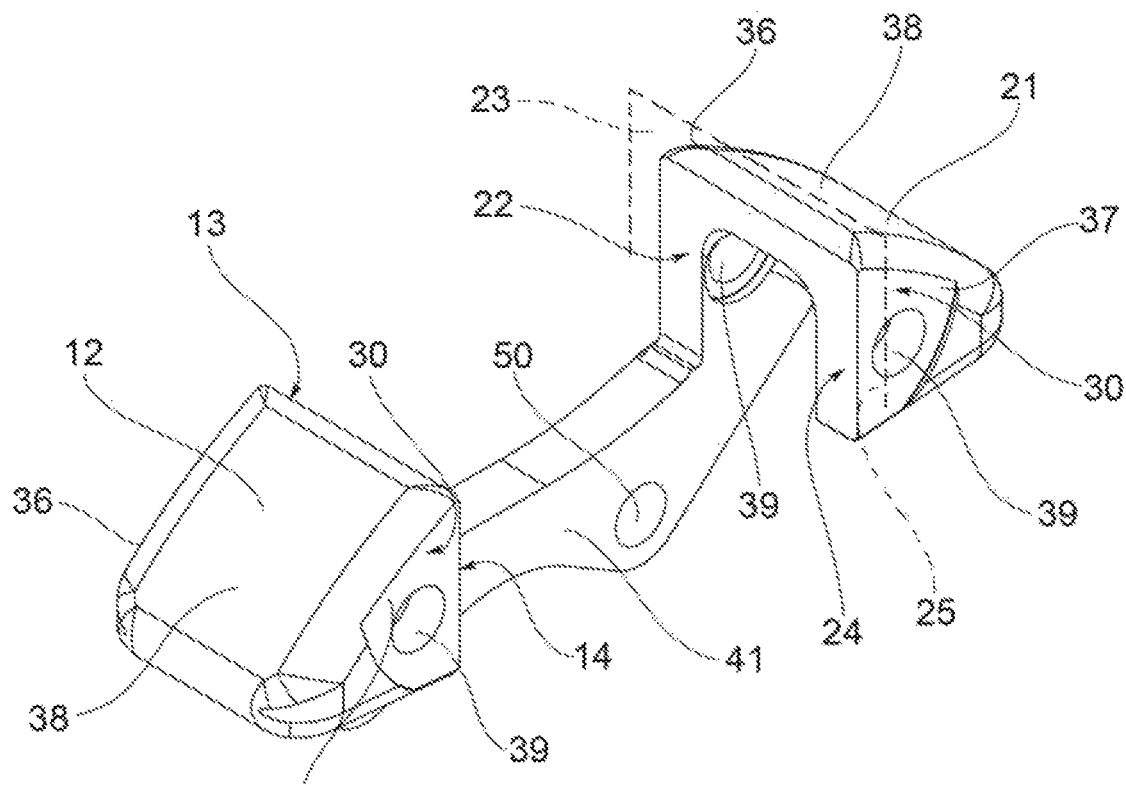
FIG. 7 is a wheel side axonometric view of the component of the caliper in FIG. 6, and in particular a first and second bridge element joined by a bridge crossbar.
Figure 8:
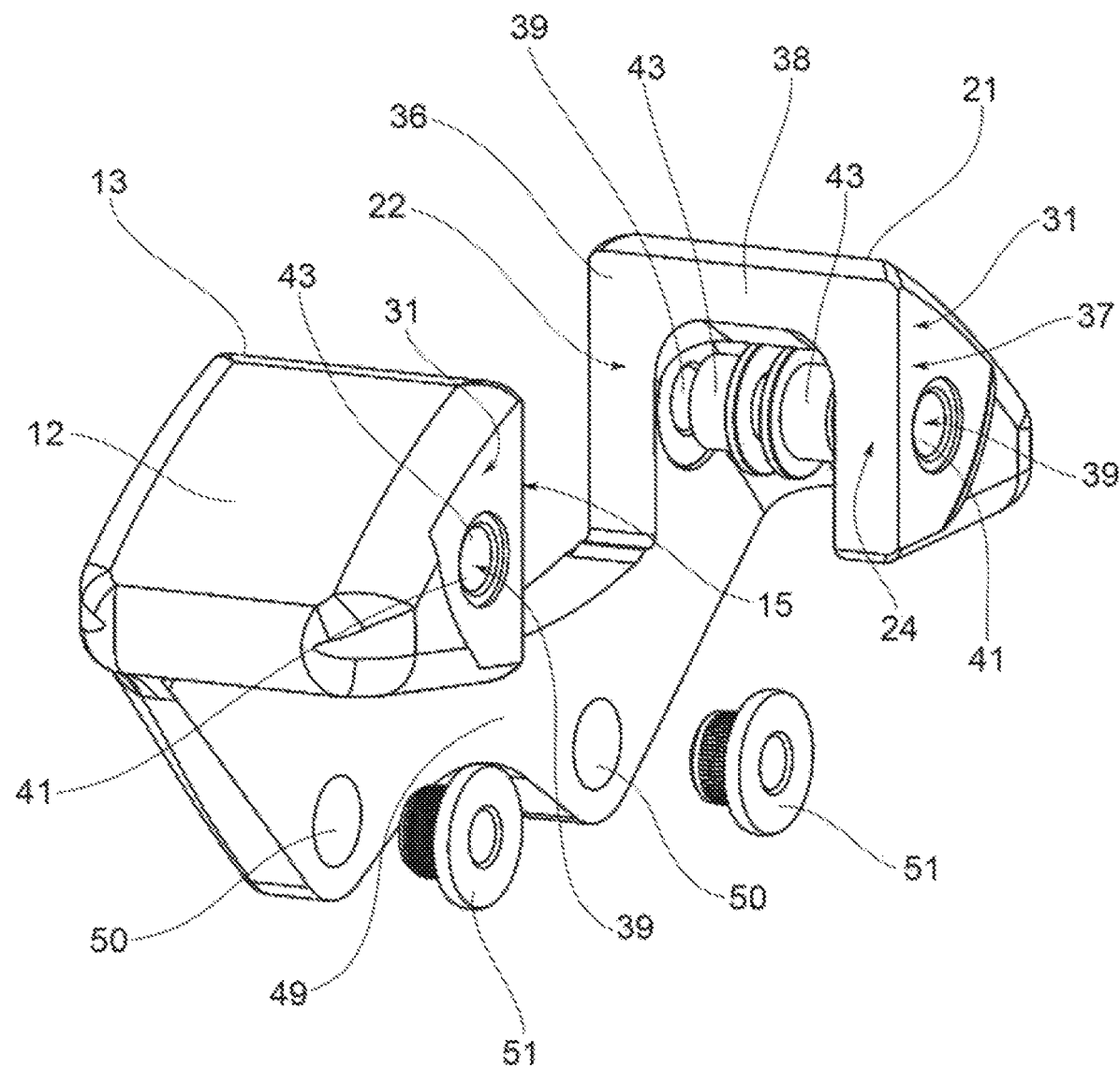
FIG. 8 shows a wheel side axonometric view of the component in FIG. 6 with parts separated with connection bushes of the elongated elements to the half-bodies and of the caliper body to the hub-holder.
Figure 9:
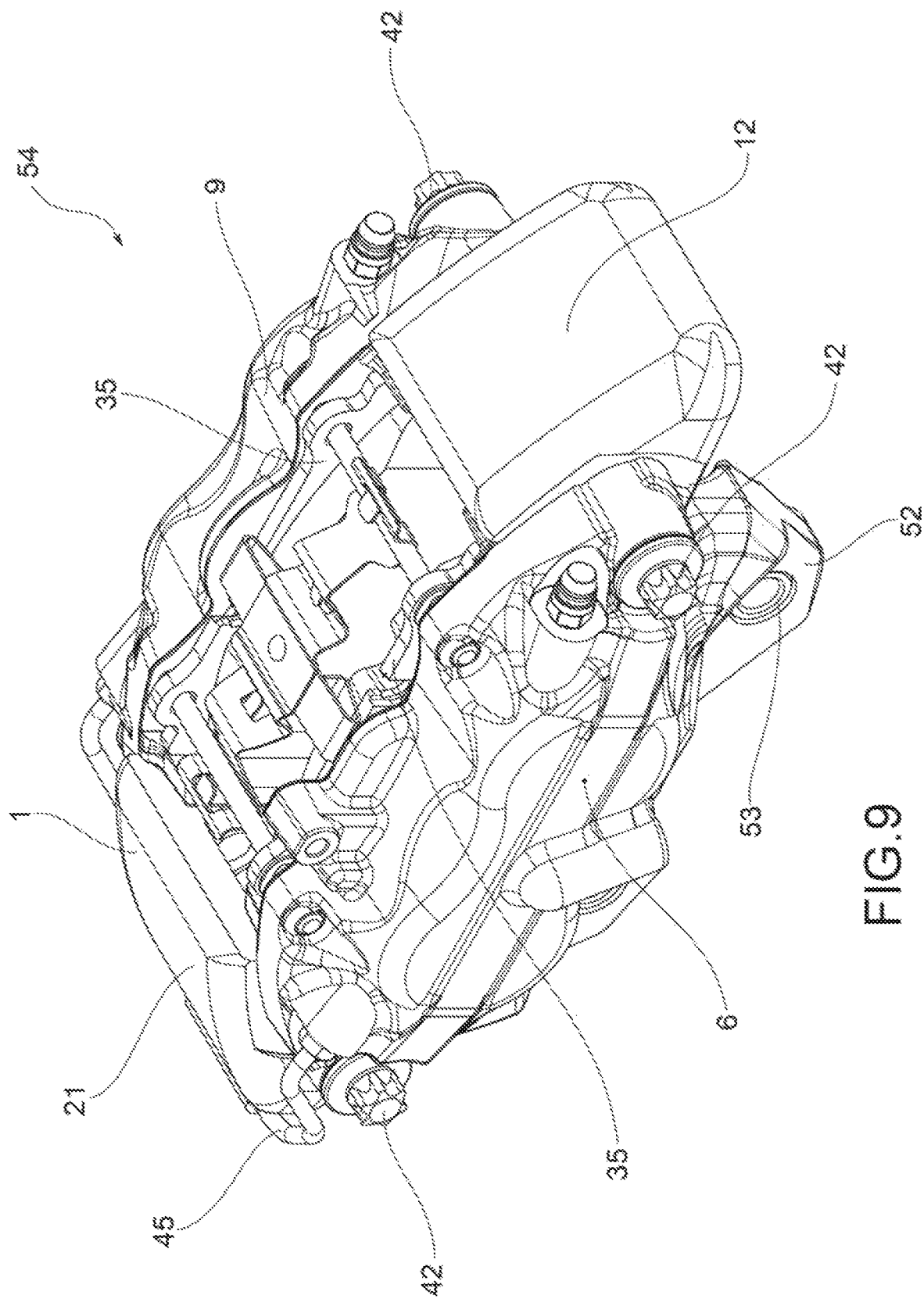
FIG. 9 is a vehicle side axonometric view of a brake caliper according to a further embodiment.
Figure 10:
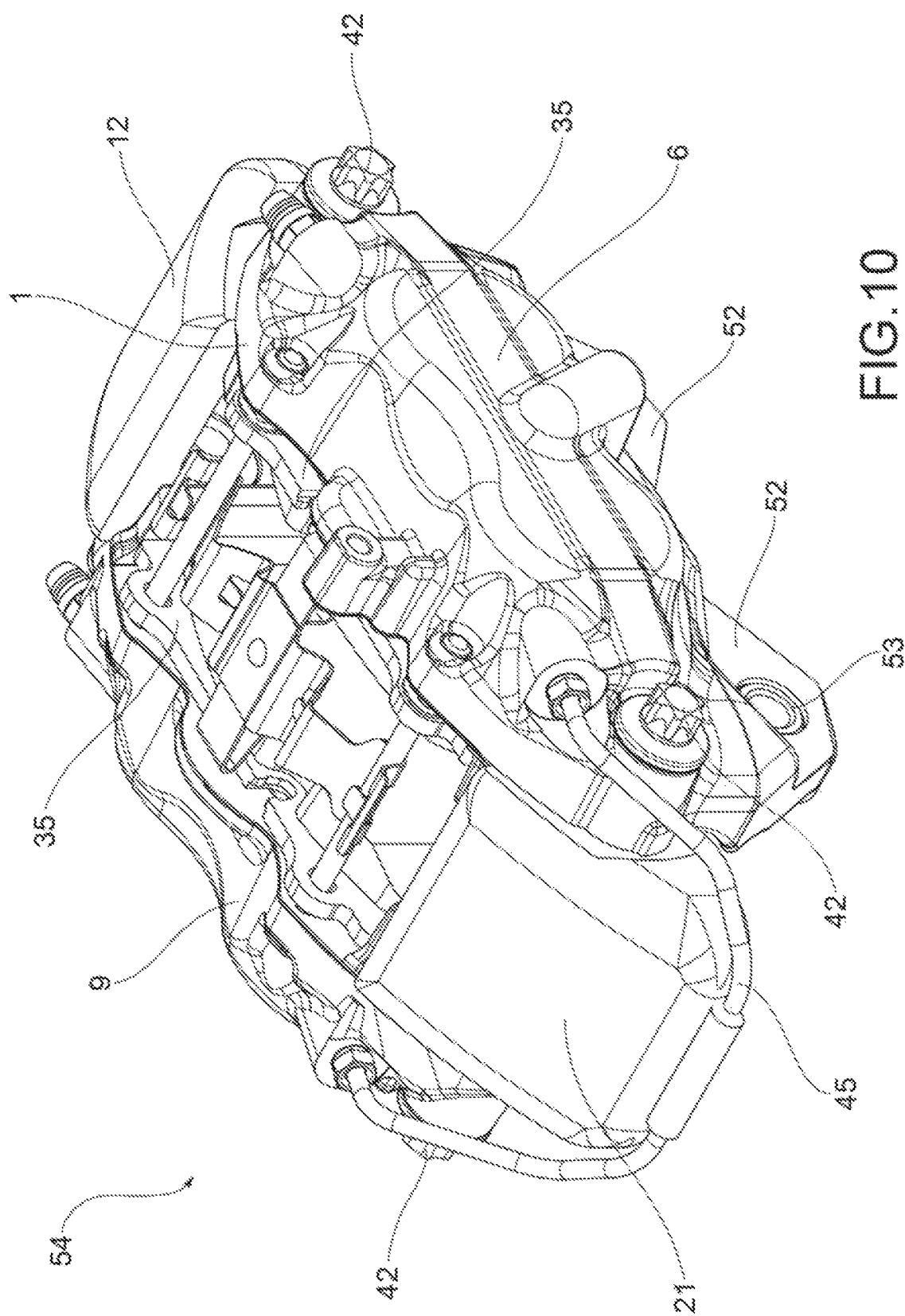
FIG. 10 shows a vehicle side axonometric view of the caliper in FIG. 9 according to a different angle.
Figure 11:
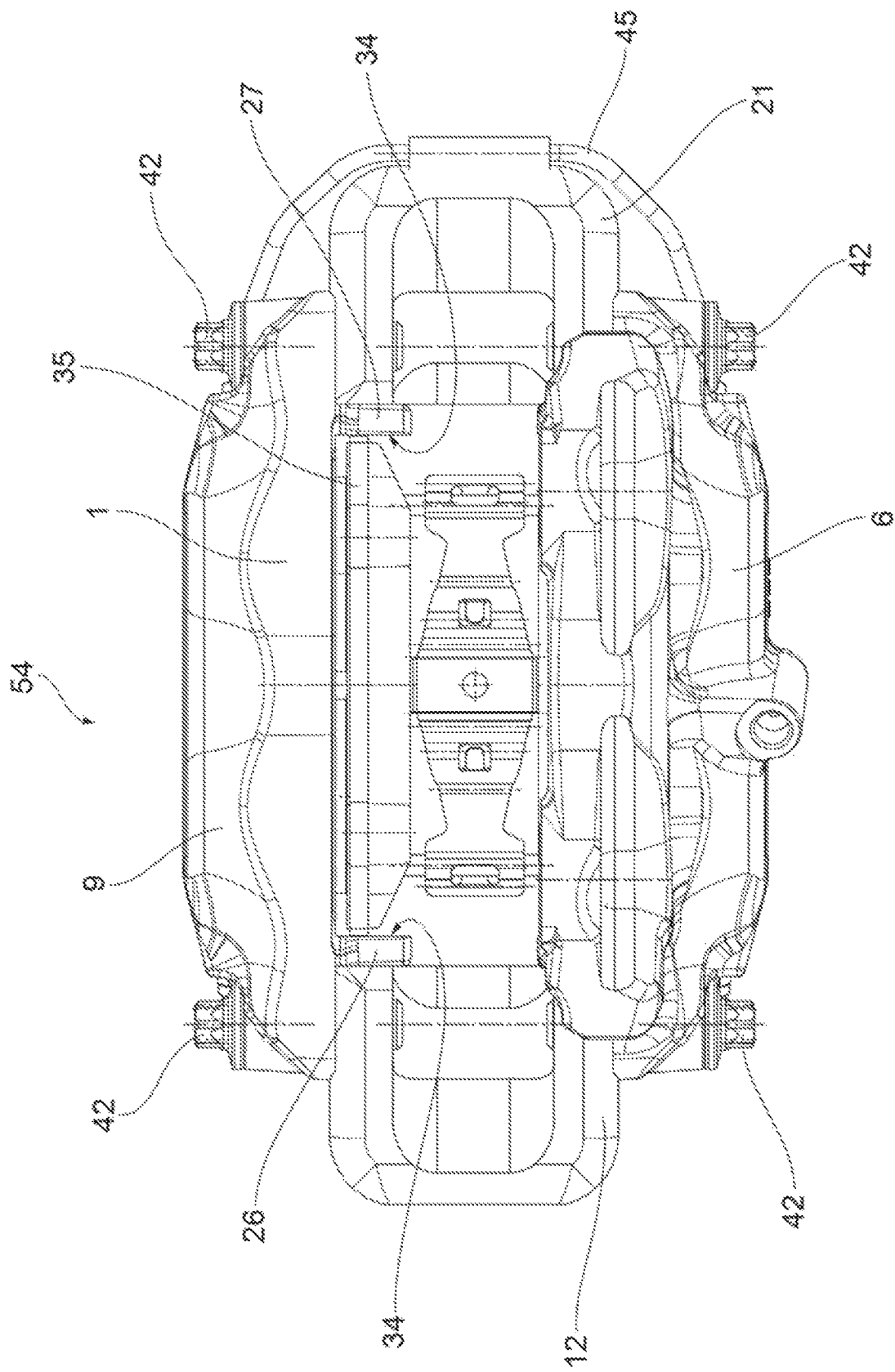
FIG. 11 is a radial view of the caliper in FIG. 9 from the rotation axis of the disc outwards.
Figure 12:
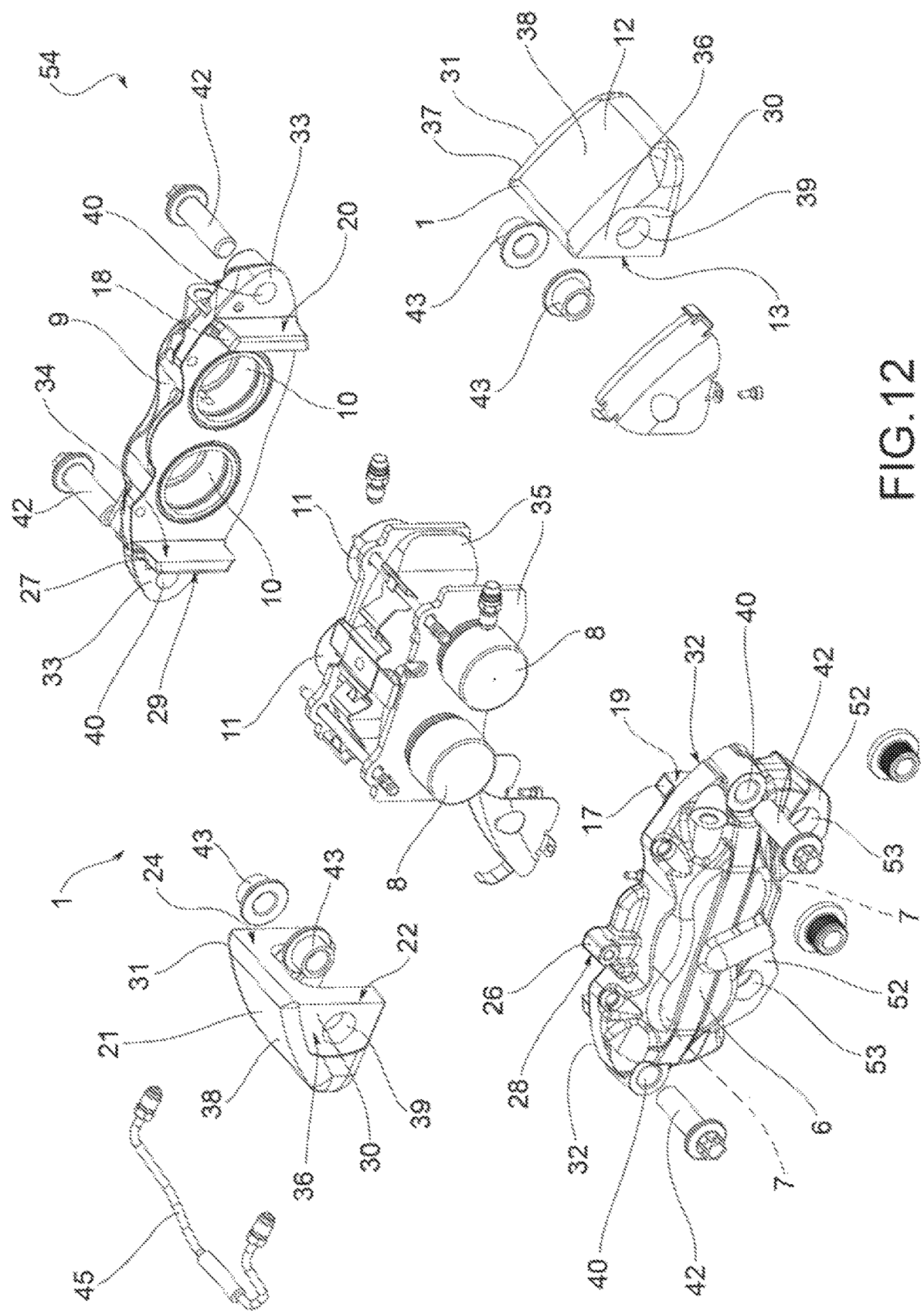
FIG. 12 shows an axonometric view of the caliper in FIG. 9 with parts separated.
Figure 13:
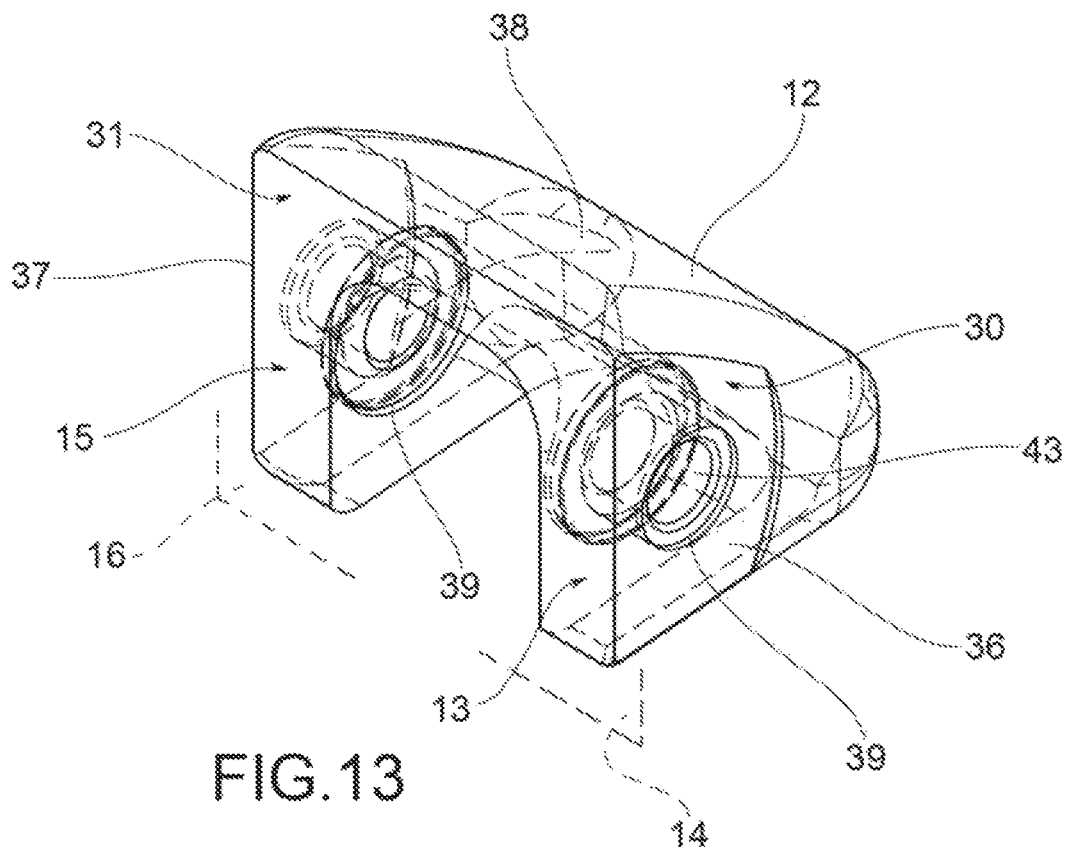
FIG. 13 is an axonometric view of a bridge element in which the partially transparent view allows highlighting the bushes present in it.
Figure 14:
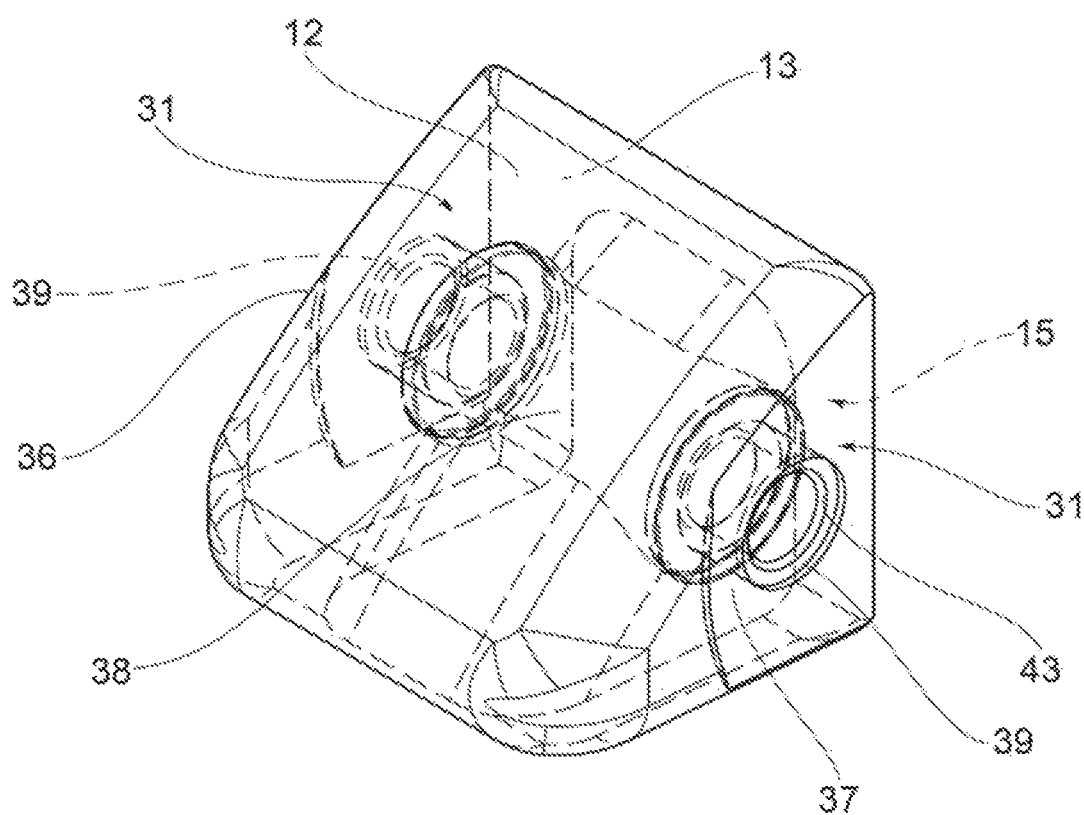
FIG. 14 is an axonometric view taken along the circumferential direction of the element in FIG. 13.
Figure 15:
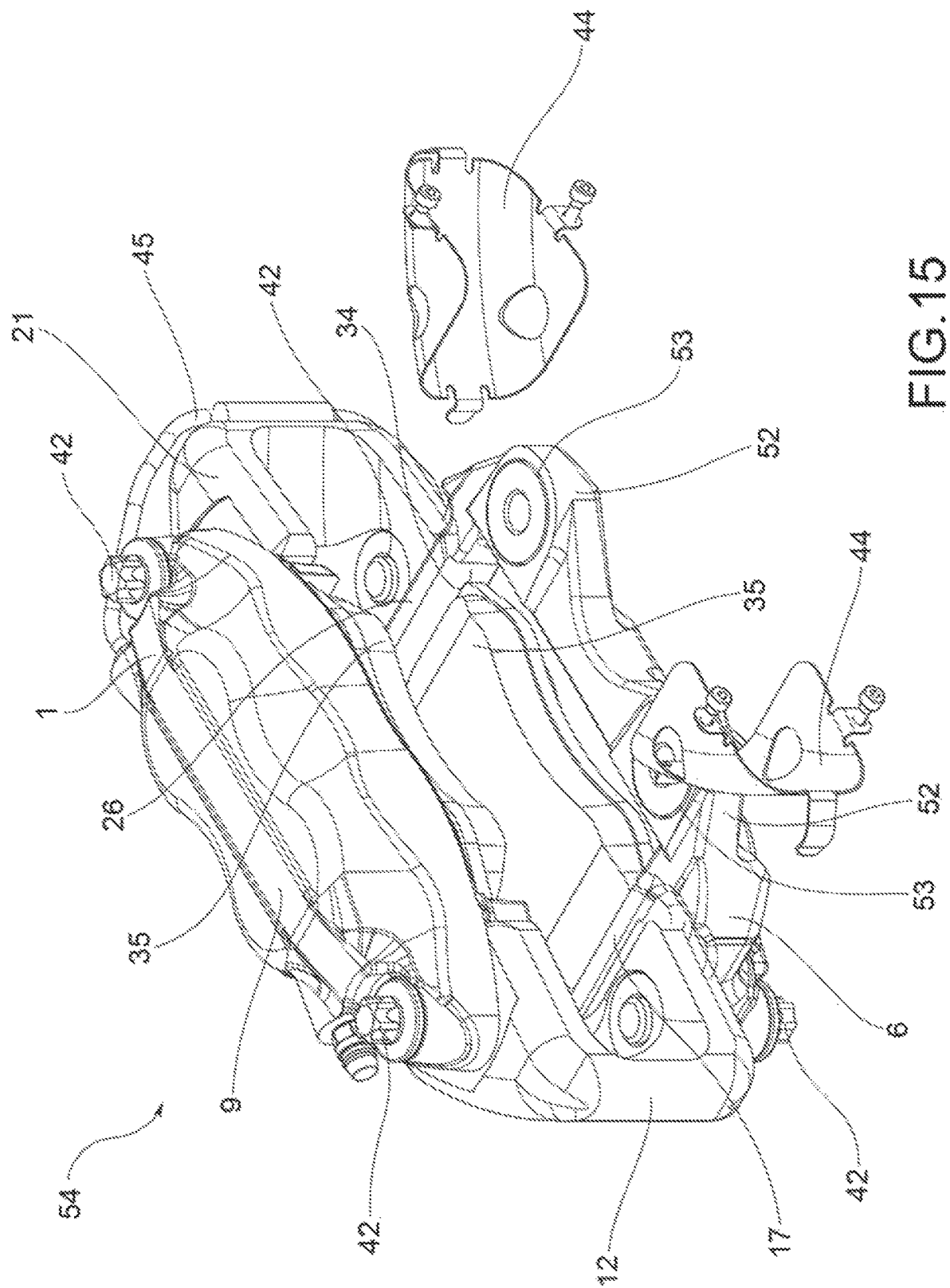
FIG. 15 is an axonometric view with parts partially separated and from the brake disc side of a caliper according to a further embodiment in which heat-guard sheets are associated with the bridge elements to protect them from the heat generated by the friction of the brake pads against the opposite braking surfaces of the brake disc during a braking action.
Figure 16:
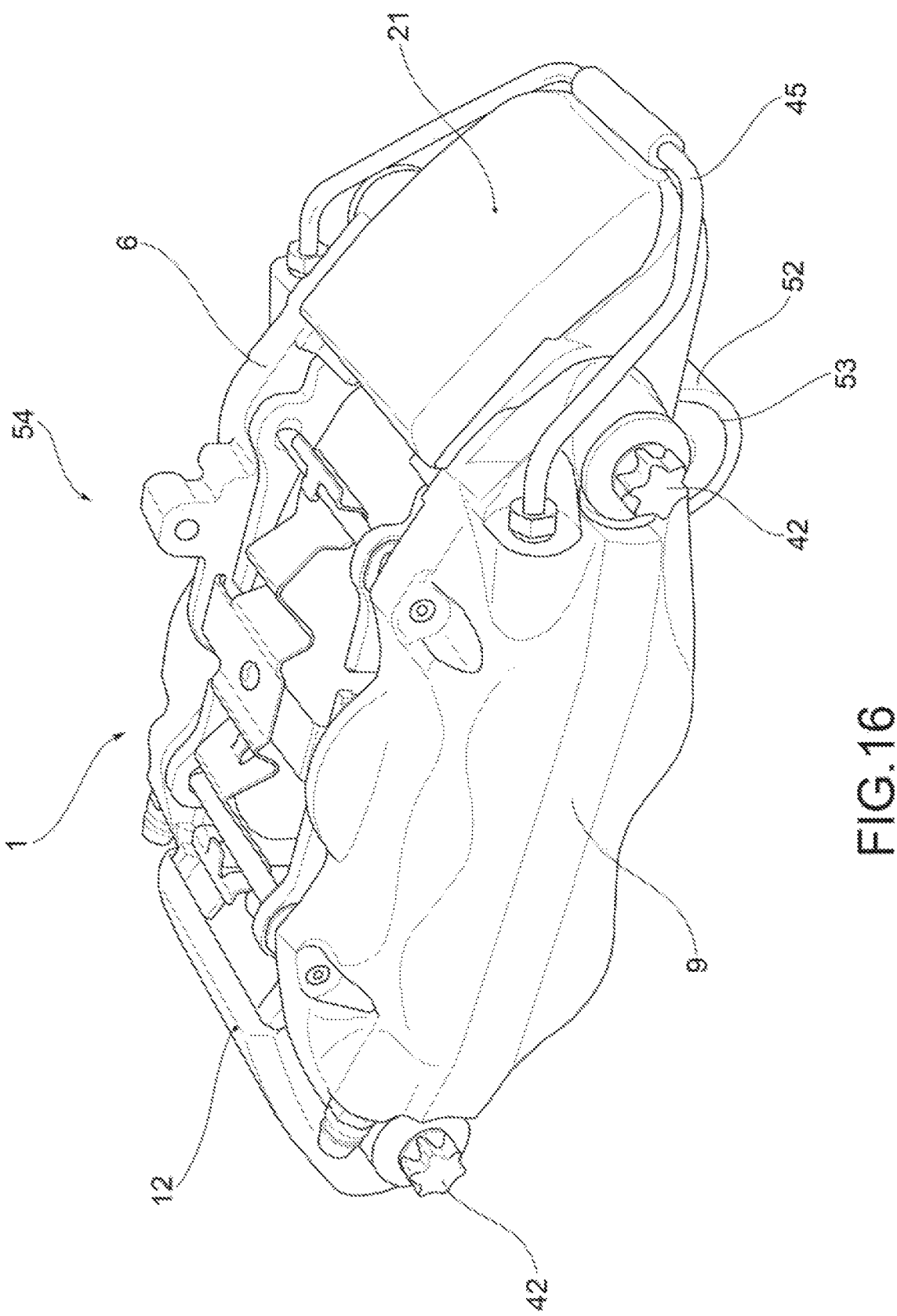
FIG. 16 shows a wheel side axonometric view of a brake caliper according to a further embodiment in which the bridge elements are made of fiber-reinforced composite material and in which a half-body has connections to the hub-holder.
Figure 17:
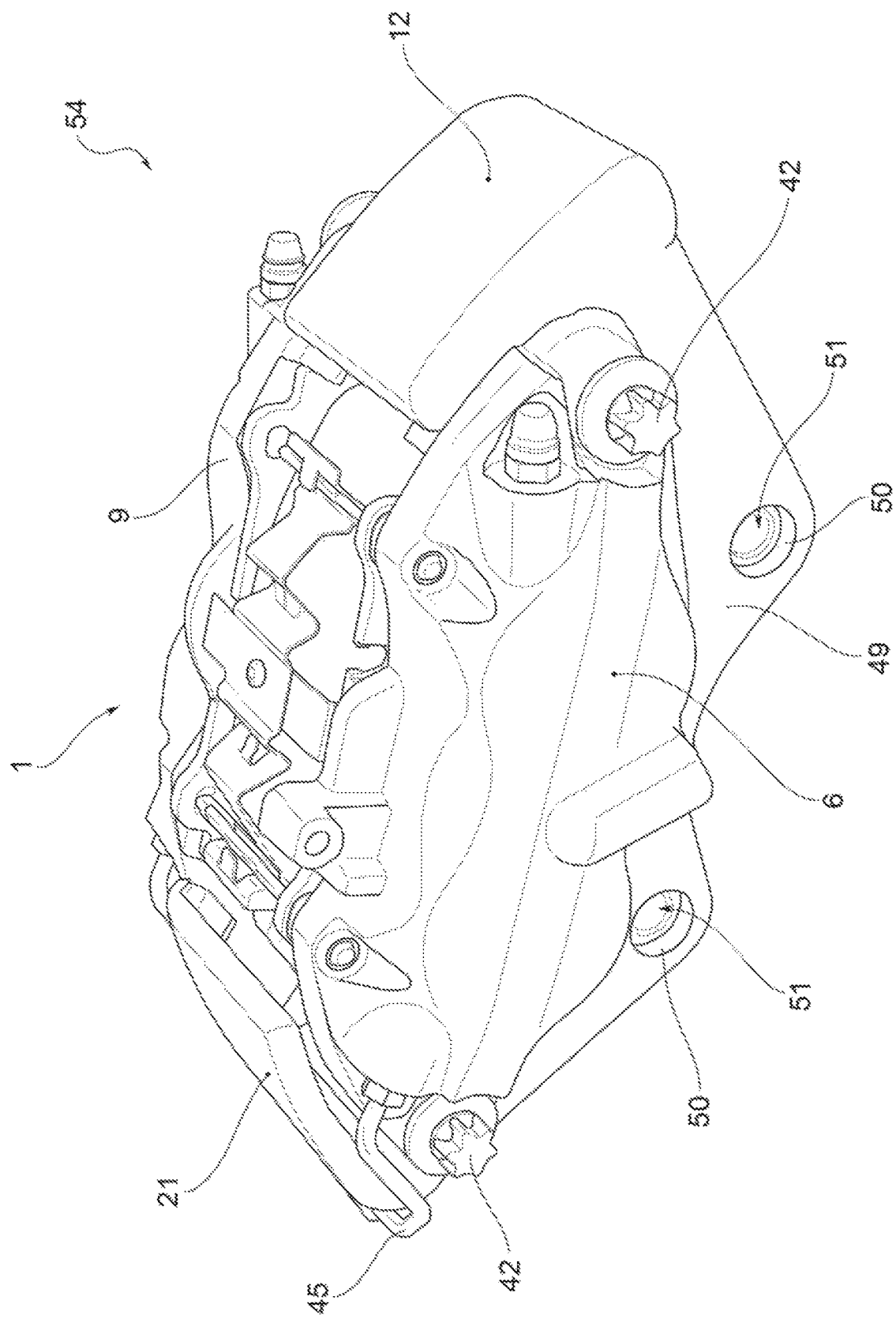
FIG. 17 shows a vehicle side axonometric view of a brake caliper according to a further embodiment in which the bridge elements are made of fiber-reinforced composite material and in which a connection crossbar of the bridge elements has connections to the hub-holder.
Figure 18:
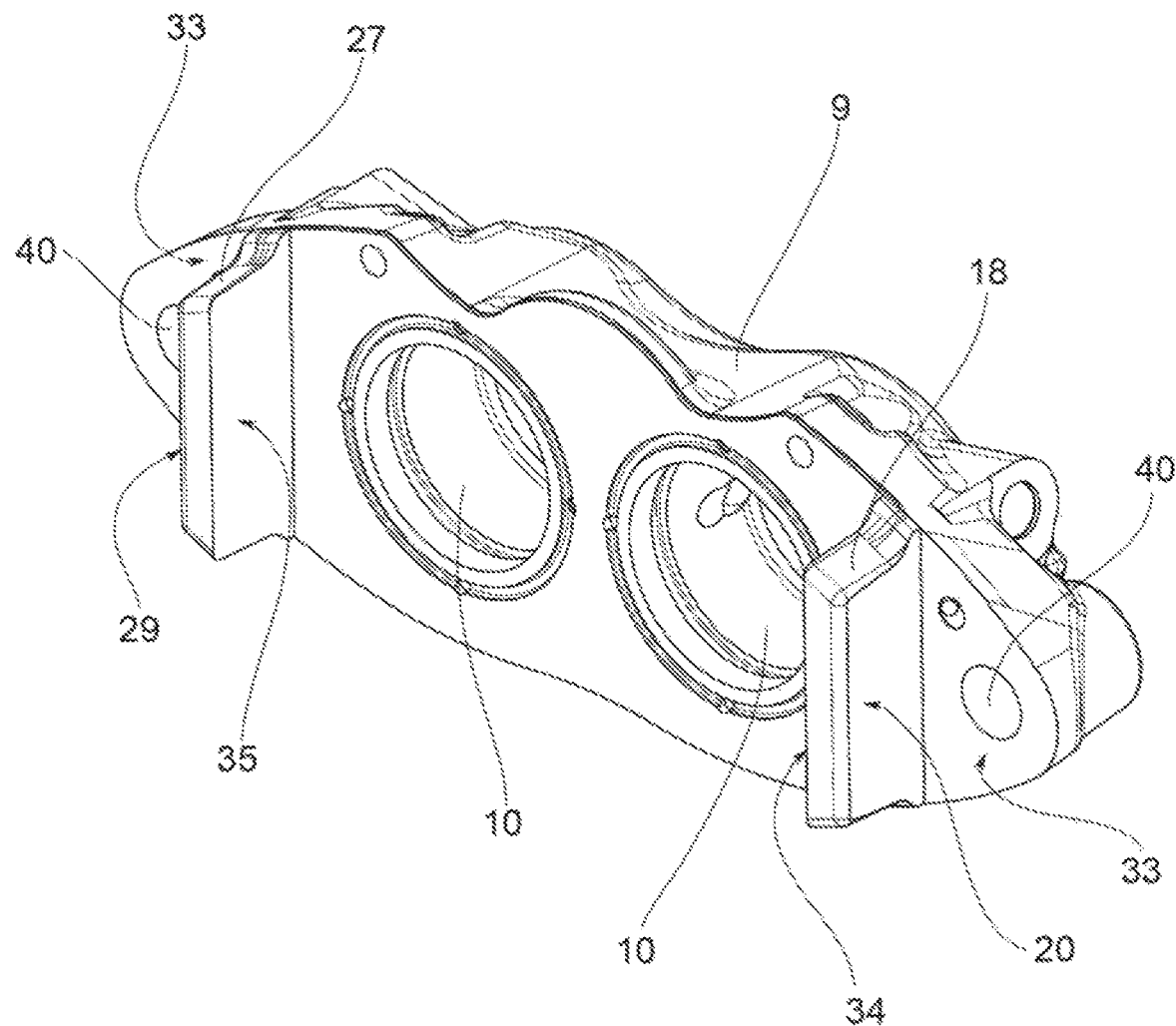
FIG. 18 shows a disc side axonometric view of a half-body of a caliper body according to the invention.
Figure 19:
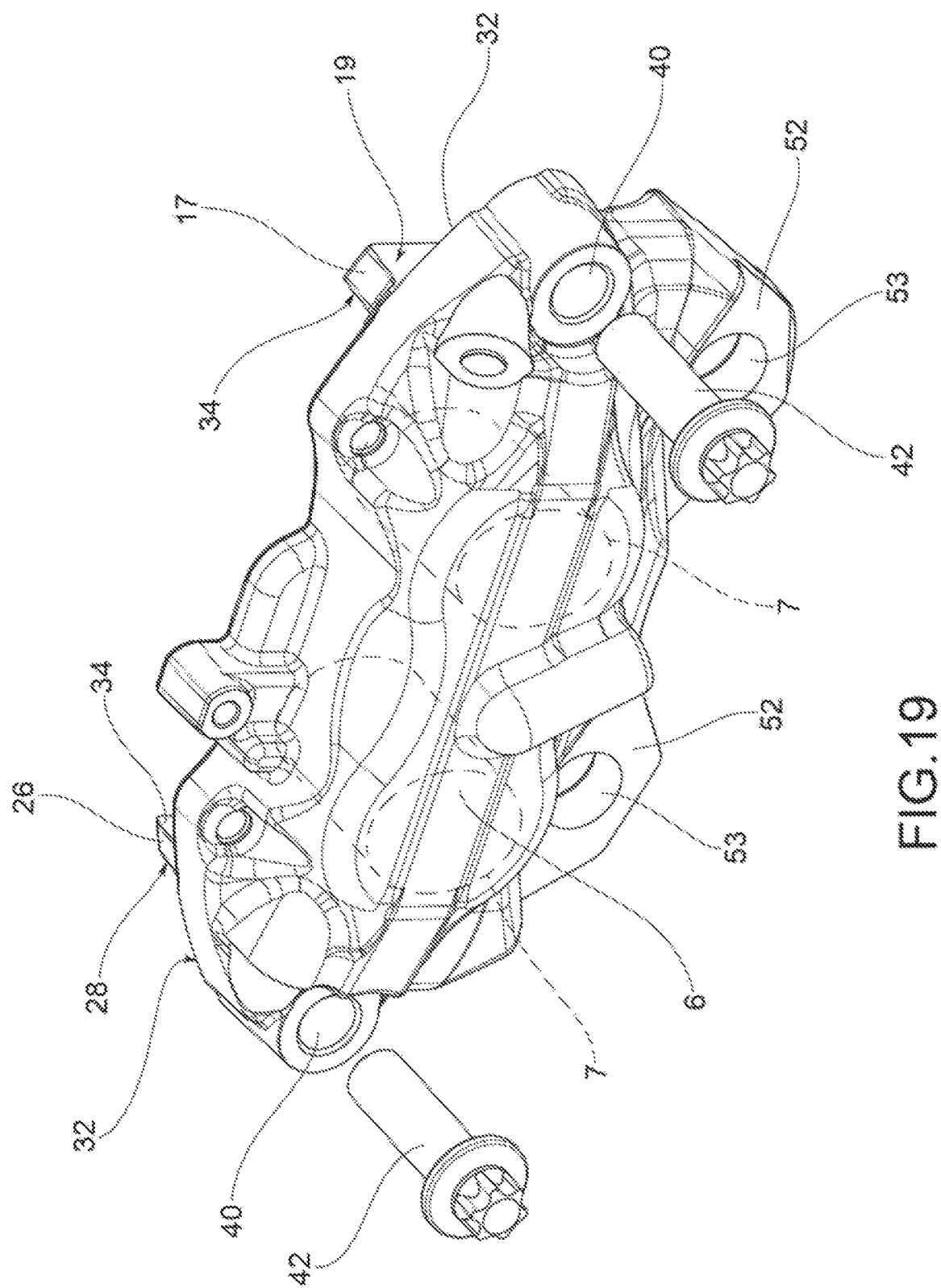
FIG. 19 is an axonometric view with separate parts of the half-body in FIG. 18 in which connecting screws of the half-body to bridge elements are added with separate parts.
Figure 20:
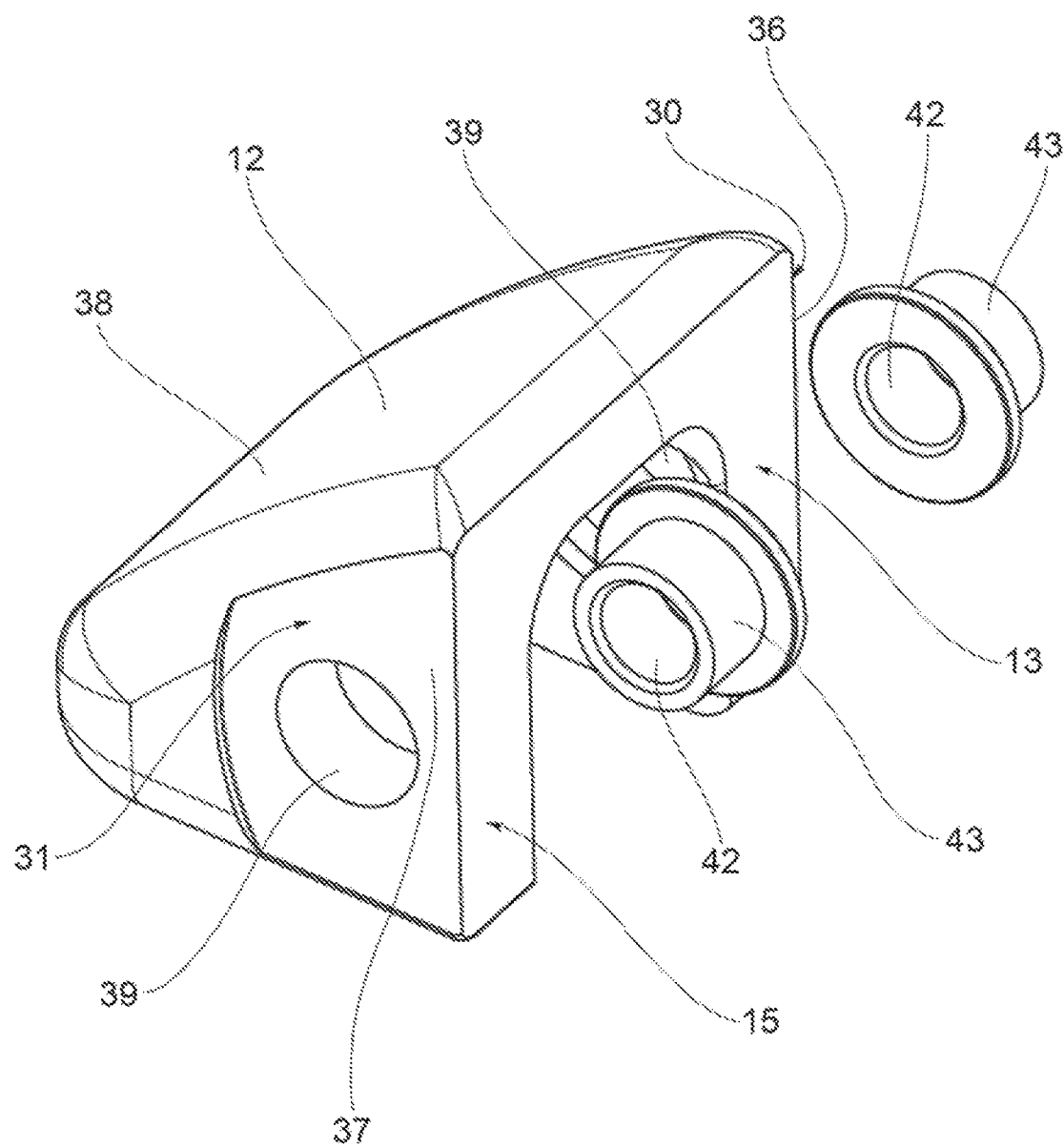
FIG. 20 shows an axonometric view of a bridge element with two bushes for the fixing of connection screws of the bridge element to the half-bodies side-by-side in separate parts.
Figure 21:
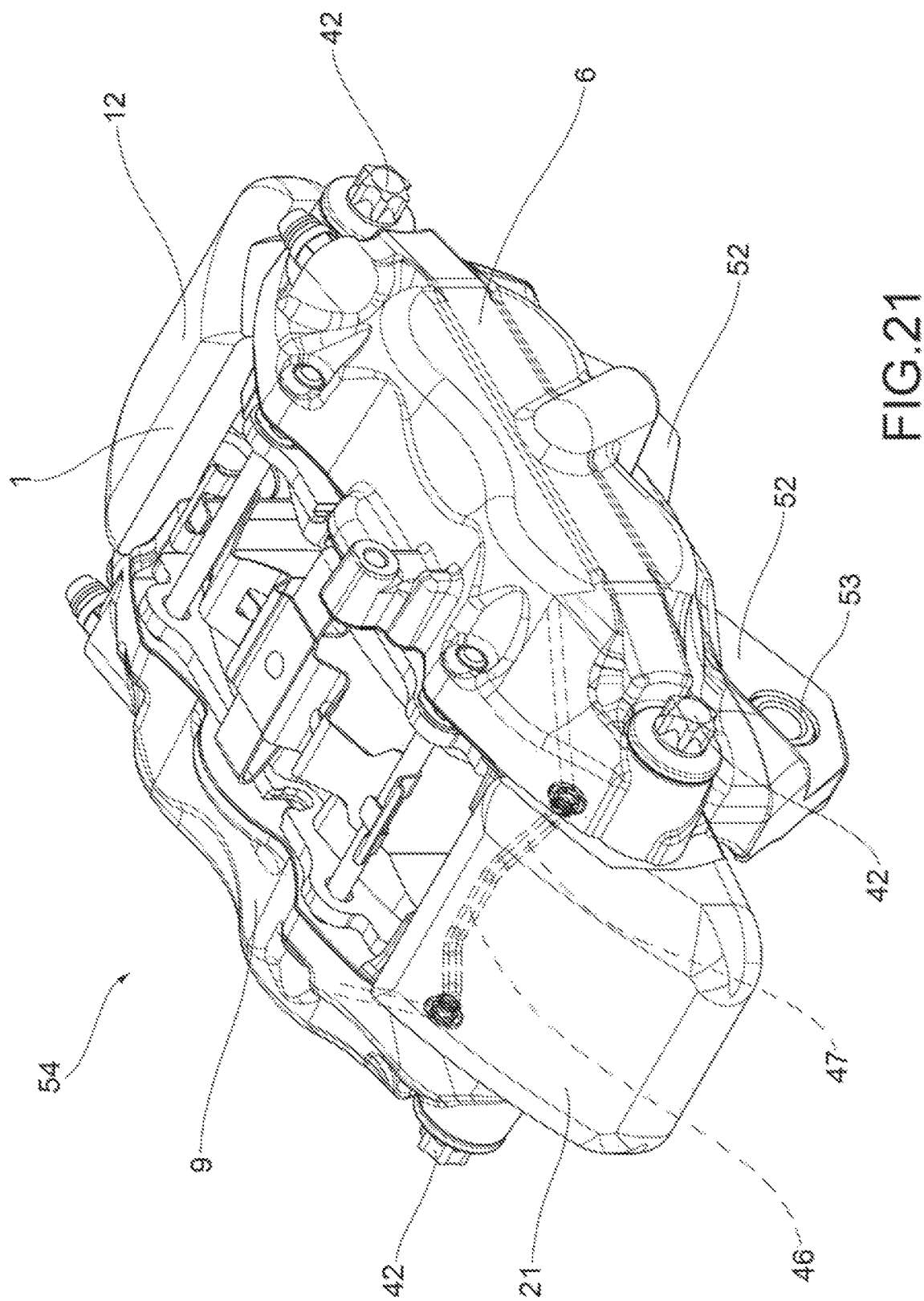
FIG. 21 shows a vehicle side axonometric view according to a further embodiment in which the feeding pipe of the brake fluid from a half-body to the opposite half-body is shown with a dashed line and in which the portion of pipe which crosses the bridge element is formed by a pipe co-molded with the bridge element.
Figure 22:
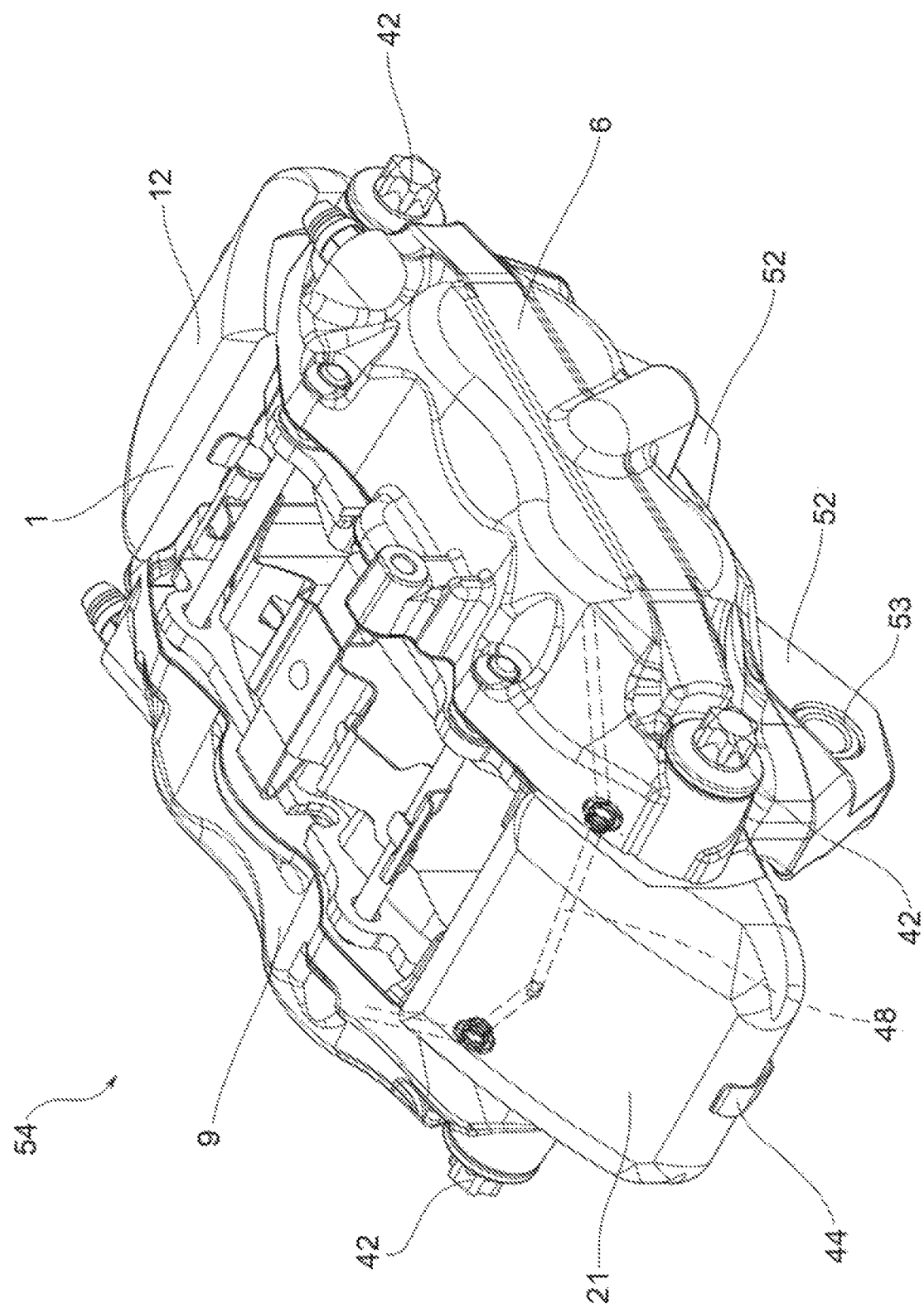
FIG. 22 shows a vehicle side axonometric view according to a further embodiment in which the feeding pipe of the brake fluid from a half-body to the opposite half-body is shown with a dashed line and in which the portion of pipe which crosses the bridge element is formed by piercing the bridge element.

According to a general embodiment, a fixed caliper body 1 for a disc brake disc 2 is provided.

Said disc brake disc 2 comprises opposite braking surfaces 3, 4 and an axial-symmetric disc body 5 adapted to rotate about a rotation axis A-A defining an axial direction X-X, said disc body 5 develops radially along a radial direction R-R orthogonal to said axial direction X-X, as well as along a circumferential direction C-C orthogonal both to said axial direction X-X and to said radial direction R-R.

Said fixed caliper body 1 comprises a first half-body 6. Said first half-body 6 is adapted to face either directly or indirectly a first braking surface 3 of said opposite braking surfaces 3, 4 of said disc brake disc 2.

Said first half-body comprises at least one first housing 7 for a first thrust device 8 to generate a first braking action by applying a pressure on a brake pad 35 and make it abut against a first braking surface 3 of a disc brake disc 2.

Said fixed caliper body 1 comprises a second half-body 9 comprising at least one second housing 10 for a second thrust device 11 to generate a second braking action.

Said second half-body 9 is adapted to face either directly or indirectly a second braking surface 4 of said opposite braking surfaces 3, 4 of said disc brake disc 2.

Said fixed caliper body 1 comprises at least one first bridge element 12 to connect and support said second half-body 9 to said first half-body 6. Said at least one first bridge element 12 comprises at least one first guiding and resting bridge surface 13 oriented according to a first predetermined resting plane 14 and at least one second guiding and resting bridge surface 15 oriented according to a second predetermined resting plane 16.

Said first half-body 6 comprises at least one first protrusion 17 which protrudes in a cantilevered manner in axial direction X-X towards the opposite second half-body 9 or towards said disc brake disc 2 when the caliper is fitted on a vehicle.

Said second half-body 9 comprises at least one second protrusion 18 which protrudes in a cantilevered manner in axial direction X-X towards the opposite first half-body 6.

Said first half-body 6, said second half-body 9 and said at least one first bridge element 12 are three mutually separable components. By virtue of the modularity of the caliper with the half-bodies, it is possible to work the housings for the thrust devices fast and very accurately, whereby reducing construction tolerances, improving thrust accuracy and reducing the undesired asymmetrical deformations in the fixed caliper body 1.

Advantageously, said at least one first protrusion 17 delimits a first guiding and resting half-body surface 19 oriented, when said at least one first bridge element 12 is connected to said first half-body 6 and when the caliper is in working conditions, according to said first predetermined resting plane 14 parallel to said at least one first guiding and resting bridge surface 13.

Said at least one second protrusion 18 delimits a second guiding and resting half-body surface 20 oriented according to said second predetermined resting plane 16 and parallel to said at least one second guiding and resting bridge surface 15 when said at least one first bridge element 12 is connected to said second half-body 9.

Advantageously, said at least one first bridge element firmly rests said at least one first guiding and resting bridge surface 13 against said first guiding and resting half-body surface 19 by connecting and orienting said at least one first bridge element 12 to said first half-body 6, creating a rest for said at least one first bridge element 12 in circumferential direction C-C.

Advantageously, said at least one first bridge element 12 firmly rests said at least one second guiding and resting bridge surface 15 against said second guiding and resting half-body surface 20 by connecting and orienting said at least one first bridge element 12 to said second half-body 9 in circumferential direction C-C.

According to an embodiment, said fixed caliper body 1 comprises at least one second bridge element 21 to connect and support said second half-body 9 to said first half-body 6. Said at least one second bridge element 21 comprises at least one third guiding and resting bridge surface 22 oriented according to a third predetermined resting plane 23 and at least one fourth guiding and resting bridge surface 24 oriented according to a fourth predetermined resting plane 25.

Said first half-body 6 comprises at least one third protrusion 26 which protrudes in a cantilevered manner in axial direction X-X towards the opposite second half-body 9.

Said second half-body 9 comprises at least one fourth protrusion 27 which protrudes in a cantilevered manner in axial direction X-X towards the opposite first half-body 6.

Said at least one third protrusion 26 delimits a third guiding and resting half-body surface 28 oriented according to said third predetermined resting plane 23 and parallel to said at least one third guiding and resting bridge surface 22 when said at least one second bridge element 21 is connected to said first half-body 6.

Said at least one fourth protrusion 27 delimits a fourth guiding and resting half-body surface 29 oriented according to said fourth predetermined resting plane 25 and parallel to said at least one fourth guiding and resting bridge surface 24 when said at least one second bridge element 21 is connected to said second half-body 9.

Said at least one second bridge element 21 firmly rests said at least one third guiding and resting bridge surface 22 against said third guiding and resting half-body surface 28 by connecting and orienting said at least one second bridge element 21 to said first half-body 6, creating a rest for said at least one second bridge element 21 in circumferential direction C-C.

Said at least one second bridge element 21 firmly rests said at least one fourth guiding and resting bridge surface 24 against said fourth guiding and resting half-body surface 29 by connecting and orienting said at least one second bridge element 21 to said second half-body 9, in circumferential direction C-C.

According to an embodiment, said at least one first and/or second bridge element 12, 21 each comprises a first and a second radial guiding and resting bridge surfaces 30, 31 which, when said bridge element 12, 21 is connected to said first and second half-bodies 6, 9, are oriented according to radial R-R and circumferential C-C directions.

Said first and second half-bodies 6, 9 comprise two first and two second radial guiding and resting half-body surfaces 32, 33.

Said at least one first and/or second bridge element 12, 21 firmly rests its first and second radial guiding and resting bridge surfaces 30, 31 against said first and second radial guiding and resting half-body surfaces 32, 33 by connecting and orienting said at least one first and/or second bridge element 12, 21 to said first and second half-bodies 6, 9, creating a rest for said at least one second bridge element 21 in axial direction X-X.

According to an embodiment, at least one of said protrusions 17, 18, 26, 27 comprises at least one pad resting surface 34 adapted to be arranged transversely to said opposite braking surfaces 3, 4 to receive the resting of at least one brake pad 35 in circumferential direction C-C.

According to an embodiment, said first and second half-bodies 6, 9 are made of a first material and said at least one bridge element 12, 21 is made of at least one second material, different from said first material.

For example, said first material is aluminum.

According to a further embodiment, said second material is a fiber-reinforced composite material.

According to an embodiment, the matrix may be ceramic and/or polymeric fiber-reinforced with carbon and/or glass and/or basalt and/or alumina and/or silicon carbide and/or silicon fibers. According to an embodiment, the matrix may be reinforced with inserts made with high-rigidity ceramic preforms, inserted in the matrix e.g. of molten aluminum, e.g. by co-fusing.

According to an embodiment, said first material has a higher density than said second material.

According to an embodiment, said second material has a modulus of elasticity greater than the modulus of elasticity of the first material.

According to an embodiment, in each half-body 6, 9, said first and/or second guiding and resting half-body surfaces 19, 20 and said first and/or second radial guiding and resting half-body surfaces 32, 33 are flat surfaces.

According to an embodiment, in each half-body 6, 9, said first guiding and resting half-body surfaces 19, 20 and said first radial guiding and resting half-body surfaces 32, 33 are mutually orthogonal surfaces.

According to an embodiment, in each half-body 6, 9, said second guiding and resting half-body surfaces 19, 20 and said second radial guiding and resting half-body surfaces 32, 33 are mutually orthogonal surfaces.

According to an embodiment, in each half-body 6, 9, said first and/or second guiding and resting half-body surfaces 19, 20 and said first and/or second radial guiding and resting half-body surfaces 32, 33 are adjacent in pairs to form an edge.

According to an embodiment, said first and/or second guiding and resting half-body surfaces 19, 20 and said first and/or second radial guiding and resting half-body surfaces 32, 33 are surfaces adjacent in pairs to form a centering system of the bridge element 12, 21 against the half-bodies 6, 9, whereby forming a parallelogram structure having particularly rigid characteristics and at the same time very small dimensions in radial direction R-R.

According to an embodiment, in each bridge element 12, 21, said first and/or second guiding and resting bridge surfaces 13, 15 and said first and/or second radial guiding and resting bridge surfaces 30, 31 are flat surfaces.

According to an embodiment, in each bridge element 12, 21, said first guiding and resting bridge surface 13, 15 and said first radial guiding and resting bridge surface 30, 31 are mutually orthogonal surfaces.

According to an embodiment, in each bridge element 12, 21, said second guiding and resting bridge surface 13, 15 and said second radial guiding and resting bridge surface 30, 31 are mutually orthogonal surfaces.

According to an embodiment, in each bridge element 12, 21, said first and/or second guiding and resting bridge surface 13, 15 and said first and/or second radial guiding and resting bridge surface 30, 31 are adjacent in pairs to form an edge. According to an embodiment, said first and/or second guiding and resting bridge surface 13, 15 and said first and/or second radial guiding and resting bridge surface 30, 31 may be flat surfaces, but also of other shapes, such as cylindrical or tapered to facilitate the centering of the bridge elements 12, 21 on said first and second half-bodies 6, 9.

According to an embodiment, said first and/or second guiding and resting bridge surfaces 13, 15 and said first and/or second radial guiding and resting bridge surfaces 30, 31 are surfaces adjacent in pairs to form a centering system of the bridge element 12, 21 against the half-bodies 6, 9, whereby forming a parallelogram structure having particularly rigid characteristics and at the same time very small dimensions in radial direction R-R.

According to an embodiment, said at least one bridge element 12, 21 forms an inverted "U"-shaped bridge housing 39 adapted to be arranged straddling said brake disc 2.

According to an embodiment, said bridge housing 39 is shielded in its portion facing the brake disc 2 by a heat-guard sheet 44 fixed to said at least one bridge element 12, 21, e.g. by means of fixing screws. For example, a solution of heat-guard sheet is known from WO 2017/021874 A1 by the applicant.

According to an embodiment, said at least one bridge element 12, 21 comprises a first and a second bridge side wall 36, 37 which at least partially faces said first and second half-body 6, 9 and an arc-shaped connection portion of the bridge 38.

According to an embodiment, said first and one second bridge side walls 36, 37 form a first and a second opposite radial guiding and resting bridge surface 30, 31.

According to an embodiment, said first and second half-bodies 6, 9 comprise a half-body through hole 40.

According to an embodiment, said first and second bridge elements 12, 21 comprise a threaded bridge housing 41.

According to an embodiment, said fixed caliper body 1 comprises at least one stud 42 accommodated in said half-body through hole 40 and screwed into said threaded housing of the bridge 41 firmly connecting said at least one first and/or second bridge element 12, 21 to said half-body 6, 9.

According to an embodiment, each of said first and second radial guiding and resting half-body surfaces 32, 33 of said first and second half-bodies 6, 9 comprise a through hole of the half-body 40.

According to an embodiment, each of said first and second radial guiding and resting bridge surfaces 30, 31 of said first and second bridge elements 12, 21 comprise a threaded bridge housing 41.

According to an embodiment, at least two studs 42 are accommodated in said half-body through holes 40 and screwed into said facing bridge threaded housings 41 firmly connecting said first and second bridge elements 12, 21 to said first and second half-bodies 6, 9.

According to an embodiment, said threaded bridge housing 41 comprises a bridge threaded bush 43 keyed into housings provided in the body of said first and/or second bridge elements 12, 21.

According to an embodiment, said threaded bridge housing 41 comprises a threaded bridge bush 43 embedded in the body of said first and/or second bridge elements 12, 21.

According to an embodiment, said threaded bridge housing 41 comprises a threaded bridge bush 43 co-molded with the body of said first and/or second bridge elements 12, 21.

According to an embodiment, said half-body through hole 40 and said bridge threaded housing 41 are directed along said axial direction X-X and are adapted to face said opposite braking surfaces 3, 4 of said brake disc 2.

According to an embodiment, said first and second half-bodies 6, 9 are fluidically supplied to feed brake fluid to said at least first and second housings 7, 10 to apply a thrust action with said at least first and second thrust devices 8, 11 on brake pads 35 adapted to abut on said opposite braking surfaces 3, 4 of said brake disc 2 to apply a braking action.

According to an embodiment, said first half-body 6 is arranged facing a vehicle and fluidically connected to the braking system; said first and second half-bodies 6, 9 are mutually fluidically connected by means of brake fluid feeding pipe 45 which externally embraces said at least one first and/or second bridge element 12, 21.

According to an embodiment, said first half-body 6 is arranged facing a vehicle and fluidically connected to the braking system; said first and second half-bodies 6, 9 are mutually fluidically connected by means of brake fluid feeding pipe 46 embedded, e.g. co-molded or co-fused, with said at least one first and/or second bridge element 12, 21.

According to an embodiment, said first half-body 6 is arranged facing a vehicle and fluidically connected to the braking system; said first and second half-bodies 6, 9 are mutually fluidically connected by means of a working brake fluid feeding pipe 48 obtained by perforating at least one first and/or second bridge element 12, 21.

According to an embodiment, said first and second bridge elements 12, 21 are mutually connected by a bridge crossbar 49.

According to an embodiment, said first and second bridge elements 12, 21 are mutually connected by a bridge crossbar 49 and said first and second bridge elements 12, 21 and said bridge crossbar 49 are in one piece.

According to an embodiment, said bridge crossbar 49 faces a vehicle and is adapted to connect the fixed caliper body 1 to a hub-holder.

According to an embodiment, said bridge crossbar 49 comprises bridge crossbar connection housings 50 to a hub-holder, adapted to receive connecting screws of the fixed caliper body 1 to said hub-holder.

According to an embodiment, said bridge crossbar connection housings 50 comprise hub-holder connection bushes 51, adapted to receive connecting screws of the fixed caliper body 1 to said hub-holder.

According to an embodiment, said hub-holder connection bushes 51 are keyed into bridge crossbar connection housings 50.

According to an embodiment, said hub-holder connection bushes 51 are embedded in said bridge crossbar 49.

According to an embodiment, said hub-holder connection bushes 51 are co-molded or co-fused in said bridge crossbar 49.

According to an embodiment, said first and second bridge elements 12, 21 are mutually separate components and each connected to said first and second half-bodies 6, 9.

According to an embodiment, said first half-body 6 faces a vehicle and comprises body connection extensions 52 forming body connection housings 53 adapted to receive screws for connecting the fixed caliper body 1 to a hub-holder.

According to an embodiment, said first and/or second half-bodies 6, 9 each comprise two first and/or second housings 7, 10 for accommodating at least two first and/or second thrust devices 8, 11 so as to apply multiple thrust actions to associated brake pads 35 on each opposite braking surface 3, 4 of the disc brake 2.

The present invention further relates to a brake caliper 54 comprising a caliper body as defined in any one of the embodiments above and comprising at least two opposite thrust devices 8, 11 and at least two opposite brake pads 35.

Those skilled in the art may make many changes and adaptations to the embodiments described above or may replace elements with others which are functionally equivalent in order to meet contingent needs without however departing from the scope of protection as described and claimed herein.

LIST OF REFERENCES

1 fixed caliper body
2 disc brake disc
3 opposite braking surfaces
4 opposite braking surfaces
5 disc body
6 first half-body
7 first housing
8 first thrust device
9 second half-body
10 second housing
11 second thrust device
12 first bridge element
13 first guiding and resting bridge surface
14 first predetermined resting plane
15 second guiding and resting bridge surface
16 second predetermined resting plane
17 first protrusion
18 second protrusion
19 first guiding and resting half-body surface
20 second guiding and resting half-body surface
21 second bridge element
22 third guiding and resting bridge surface
23 third predetermined resting plane
24 fourth guiding and resting bridge surface
25 fourth predetermined resting plane
26 third protrusion
27 fourth protrusion
28 third guiding and resting half-body surface
29 fourth guiding and resting half-body surface
30 first radial guiding and resting bridge surface
31 second radial guiding and resting bridge surface
32 first radial guiding and resting half-body surface
33 second radial guiding and resting half-body surface
34 pad resting surface
35 brake pad
36 first side bridge side wall
37 second bridge side wall
38 bridge connection portion
39 bridge housing
40 half-body through hole
41 bridge threaded housing
42 stud
43 bridge threaded bush
44 heat-guard sheet
45 outer brake fluid feeding pipe
46 inner brake fluid feeding pipe
47 inner brake fluid feeding pipe
48 working brake fluid feeding pipe
49 bridge crossbar
50 bridge crossbar connection housings
51 hub-holder connection bushes
52 body connection extensions
53 body connection housings
54 brake caliper
A-A direction axial and rotation axis
X-X axial direction
R-R radial direction
C-C circumferential direction

The invention claimed is:

1. A fixed caliper body for a disc brake disc,
said disc brake disc comprising opposite braking surfaces and an axial-symmetric disc body adapted to rotate about a rotation axis (A-A) defining an axial direction (X-X), said axial-symmetric disc body developing radially along a radial direction (R-R) orthogonal to said axial direction (X-X), and along a circumferential direction (C-C) orthogonal both to said axial direction (X-X) and to said radial direction (R-R);
said fixed caliper body comprising:
a first half-body comprising at least one first housing for a first thrust device to generate a first braking action; said first half-body being adapted to face either directly or indirectly a first braking surface of said opposite braking surfaces of said disc brake disc;
a second half-body comprising at least one second housing for a second thrust device to generate a second braking action; said second half-body being adapted to face either directly or indirectly a second braking surface of said opposite braking surfaces of said disc brake disc;
at least one first bridge element to connect and support said second half-body to said first half-body; said at least one first bridge element comprising at least one first guiding and resting bridge surface oriented according to a first predetermined resting plane and at least one second guiding and resting bridge surface oriented according to a second predetermined resting plane;
wherein
said first half-body comprises at least one first protrusion protruding in a cantilevered manner in axial direction (X-X) towards the opposite second half-body;
said second half-body comprises at least one second protrusion protruding in a cantilevered manner in axial direction (X-X) towards the opposite first half-body;
said first half-body, said second half-body and said at least one first bridge element are three mutually separable components;
wherein:
said at least one first protrusion delimits a first guiding and resting half-body surface oriented according to said first predetermined resting plane and parallel to said at least one first guiding and resting bridge surface when said at least one first bridge element is connected to said first half-body;
said at least one second protrusion delimits a second guiding and resting half-body surface oriented according to said second predetermined resting plane and parallel to said at least one second guiding and resting bridge surface when said at least one first bridge element is connected to said second half-body;
said at least one first bridge element firmly rests said at least one first guiding and resting bridge surface against said first guiding and resting half-body surface by connecting and orienting said at least one first bridge element to said first half-body, creating a rest for said at least one first bridge element in circumferential direction (C-C);

said at least one first bridge element firmly rests said at least one second guiding and resting bridge surface against said second guiding and resting half-body surface by connecting and orienting said at least one first bridge element to said second half-body in circumferential direction (C-C);

at least one of said protrusions comprises at least one pad resting surface adapted to be arranged transversely to said opposite braking surfaces to receive resting of at least one brake pad in circumferential direction (C-C).

2. The fixed caliper body of claim 1, wherein:

said fixed caliper body further comprises at least one second bridge element to connect and support said second half-body to said first half-body; said at least one second bridge element comprising at least one third guiding and resting bridge surface oriented according to a third predetermined resting plane and at least one fourth guiding and resting bridge surface oriented according to a fourth predetermined resting plane;

said first half-body further comprises at least one third protrusion protruding in a cantilevered manner in axial direction (X-X) towards the opposite second half-body;

said second half-body further comprises at least one fourth protrusion protruding in a cantilevered manner in axial direction (X-X) towards the opposite first half-body;

said at least one third protrusion delimits a third guiding and resting half-body surface oriented according to said third predetermined resting plane and parallel to said at least one third guiding and resting bridge surface when said at least one second bridge element is connected to said first half-body;

said at least one fourth protrusion delimits a fourth guiding and resting half-body surface oriented according to said fourth predetermined resting plane and parallel to said at least one fourth guiding and resting bridge surface when said at least one second bridge element is connected to said second half-body;

said at least one second bridge element firmly rests said at least one third guiding and resting bridge surface against said third guiding and resting half-body surface by connecting and orienting said at least one second bridge element to said first half-body, creating a rest for said at least one second bridge element in circumferential direction (C-C);

said at least one second bridge element firmly rests said at least one fourth guiding and resting bridge surface against said fourth guiding and resting half-body surface by connecting and orienting said at least one second bridge element to said second half-body, in circumferential direction (C-C).

3. The fixed caliper body of claim 2, wherein:

said at least one first and/or second bridge element each comprises a first and a second radial guiding and resting bridge surfaces which, when the bridge element is connected to the first and second half-bodies, are oriented according to radial (R-R) and circumferential (C-C) directions;

said first and second half-bodies comprise two first and two second radial guiding and resting half-body surfaces;

said at least one first and/or second bridge element firmly rests the first and second radial guiding and resting bridge surfaces against said first and second radial guiding and resting half-body surfaces by connecting and orienting said at least one first and/or second bridge element to the first and second half-bodies, creating a rest for said at least one second bridge element in axial direction (X-X).

4. The fixed caliper body of claim 1, wherein:

said first and second half-bodies are made of a first material and said at least one bridge element is made of at least a second material, different from said first material; wherein said first material is aluminum; and/or wherein said second material is a fiber-reinforced composite material, including materials with ceramic and/or polymeric matrix fiber-reinforced with carbon and/or glass and/or basalt and/or alumina and/or silicon carbide and/or silicon fibers; and/or wherein said first material has a greater density than said second material; and/or wherein said second material has a modulus of elasticity greater than the modulus of elasticity of the first material.

5. The fixed caliper body of claim 3, wherein:

in each half-body, the first and/or second guiding and resting half-body surface and the first and/or second radial guiding and resting half-body surface are flat surfaces; and/or wherein in each half-body, said first guiding and resting half-body surface and said first radial guiding and resting half-body surface are mutually orthogonal surfaces; and/or wherein in each half-body, said second guiding and resting half-body surface and said second radial guiding and resting half-body surface are mutually orthogonal surfaces; and/or wherein in each half-body, said first and/or second guiding and resting half-body surface and said first and/or second radial guiding and resting half-body surface are adjacent in pairs to form an edge.

6. The fixed caliper body of claim 3, wherein:

in each bridge element, said first and/or second guiding and resting bridge surface and said first and/or second radial guiding and resting bridge surface are flat surfaces; and/or wherein in each bridge element, said first guiding and resting bridge surface and said first radial guiding and resting bridge surface are mutually orthogonal surfaces; and/or wherein in each bridge element, said second guiding and resting bridge surface and said second radial guiding and resting bridge surface are mutually orthogonal surfaces; and/or wherein in each bridge element, said first and/or second guiding and resting bridge surface and said first and/or second radial guiding and resting bridge surface are adjacent in pairs to form an edge.

7. The fixed caliper body of claim 1, wherein said at least one first and/or second bridge element forms an inverted U-shaped bridge housing arranged straddling said disc brake disc, and wherein said bridge housing is shielded in its portion facing the disc brake disc by a heat-guard sheet fixed to said at least one first and/or second bridge element.

8. The fixed caliper body of claim 1, wherein said at least one first and/or second bridge element comprises a first and a second bridge side walls at least partially facing the first and second half-bodies and an arc-shaped bridge connection portion; and wherein said first and a second bridge side walls form a first and a second opposite radial guiding and resting bridge surface.

9. The fixed caliper body of claim 1, wherein:
said first and second half-bodies comprise a half-body through hole,
said first and second bridge elements comprise a bridge threaded housing,
said fixed caliper body comprises at least one stud accommodated in said half-body through hole and screwed into said bridge threaded housing firmly connecting said at least one bridge element to said half-body; and/or wherein
each of said first and second radial guiding and resting half-body surfaces of said first and second half-bodies comprise a half-body through hole; and wherein
each of said first and second radial guiding and resting bridge surfaces of said first and second bridge elements comprise a threaded bridge housing; and wherein
at least two studs are accommodated in the half-body through holes and screwed into facing bridge threaded housings firmly connecting the first and second bridge elements to the first and second half-bodies; and/or wherein
the bridge threaded housing comprises a bridge threaded bush keyed into housings provided in the body of said first and/or second bridge elements; and/or wherein
said bridge threaded housing comprises a bridge threaded bush embedded in the body of said first and/or second bridge elements; and/or wherein
said bridge threaded housing comprises a bridge threaded bush co-molded with the body of said first and/or second bridge elements; and/or wherein
said half-body through hole and said bridge threaded housing are directed along said axial direction (X-X) and are adapted to face said opposite braking surfaces of said disc brake disc.

10. The fixed caliper body of claim 1, wherein said first and second half-bodies are fluidically supplied to feed brake fluid to said at least first and second housings to apply a thrust action with said first and second thrust devices on brake pads adapted to abut on said opposite braking surfaces of said disc brake disc to apply a braking action.

11. The fixed caliper body of claim 1, wherein said first half-body is arranged facing a vehicle and fluidically connected to a braking system; said first and second half-bodies are mutually fluidically connected by a brake fluid feeding pipe externally embracing the at least one first and/or second bridge element.

12. The fixed caliper body of claim 1, wherein said first half-body is arranged facing a vehicle and fluidically connected to a braking system; said first and second half-bodies are mutually fluidically connected by an embedded brake fluid feeding pipe that is co-molded or co-fused with the at least one first and/or second bridge element.

13. The fixed caliper body of claim 1, wherein said first half-body is arranged facing a vehicle and fluidically connected to a braking system; said first and second half-bodies are mutually fluidically connected by a working brake fluid feeding pipe obtained by perforating the at least one first and/or second bridge element.

14. The fixed caliper body of claim 1, wherein:
said first and second bridge elements are mutually connected by a bridge crossbar; and/or wherein
said first and second bridge elements are mutually connected by a bridge crossbar and said first and second bridge elements and said bridge crossbar are in one piece; and/or wherein
said bridge crossbar faces a vehicle and is adapted to connect the fixed caliper body to a hub-holder; and/or wherein
said bridge crossbar comprises bridge crossbar connecting housings to a hub-holder, adapted to receive connecting screws of the fixed caliper body to said hub-holder; and/or wherein
said bridge crossbar connection housings comprise hub-holder connecting bushes, adapted to receive connecting screws of the fixed caliper body to said hub-holder; wherein
said hub-holder connecting bushes are keyed into the bridge crossbar connecting housings; and/or wherein
said hub-holder connecting bushes are embedded in said bridge crossbar; and/or wherein
said hub-holder connecting bushes are co-molded or co-fused in said bridge crossbar.

15. The fixed caliper body of claim 1, wherein said first and second bridge elements are mutually separate components and each is connected to said first and second half-bodies.

16. The fixed caliper body of claim 1, wherein said first half-body faces a vehicle and comprises body connection extensions forming body connection housings adapted to receive screws for connecting the fixed caliper body to a hub-holder.

17. The fixed caliper body of claim 1, wherein said first and/or second half-body each comprises two first and/or second housings for accommodating at least two first and/or second thrust devices to apply multiple thrust actions to associated brake pads on each opposite braking surface of the disc brake disc.

18. A brake caliper comprising the fixed caliper body according to claim 1 and further comprising at least two opposite thrust devices and at least two opposite brake pads.

* * * * *